United States Patent [19]

Dannheim et al.

[11] Patent Number: 5,399,674
[45] Date of Patent: Mar. 21, 1995

[54] DYESTUFFS CONTAINING PYRIMIDINE-CARBOXYLIC ACID AMIDE RADICAL HAVING FIBER-REACTIVE GROUP, PROCESSES FOR THEIR PREPARATION AND THEIR USE

[75] Inventors: Jörg Dannheim, Frankfurt am Main; Werner H. Russ, Flörsheim am Main, both of Germany

[73] Assignee: Hoechst Aktiengesellschaft, Frankfurt am Main, Germany

[21] Appl. No.: 162,638

[22] Filed: Dec. 3, 1993

[30] Foreign Application Priority Data

Dec. 4, 1992 [DE] Germany ............... 42 40 853.9

[51] Int. Cl.$^6$ .............. C09B 62/503; C09B 62/20; D06P 1/38
[52] U.S. Cl. .................. 534/618; 534/617; 534/625; 534/627; 534/635; 534/637; 534/638; 540/125; 544/76; 544/294
[58] Field of Search ........... 534/617, 618, 625, 627, 534/635, 637, 638; 540/125; 544/76, 294

[56] References Cited

U.S. PATENT DOCUMENTS

| | | | |
|---|---|---|---|
| 3,433,781 | 3/1969 | Ackermann et al. | 534/637 X |
| 3,458,496 | 7/1969 | Guenthard | 534/637 X |
| 4,118,382 | 10/1978 | Jager et al. | 534/633 |
| 4,709,018 | 11/1987 | Seitz | 534/618 |
| 4,918,169 | 4/1990 | Hoegerle | 534/618 |

FOREIGN PATENT DOCUMENTS

| | | |
|---|---|---|
| 0141776 | 5/1985 | European Pat. Off. |
| 0304924 | 3/1989 | European Pat. Off. |
| 2314946 | 10/1974 | Germany |
| 2103233 | 2/1983 | United Kingdom |

*Primary Examiner*—Robert W. Ramsuer
*Assistant Examiner*—Fiona T. Powers

[57] ABSTRACT

Fiber-reactive dyestuffs, processes for their preparation and their use

Dyestuffs of the formula (1) are described

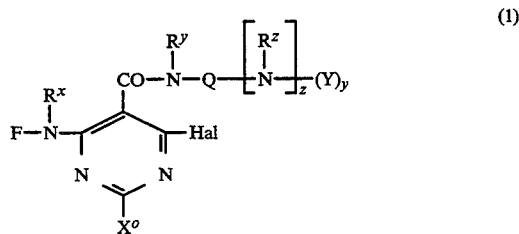

The dyestuffs have fiber-reactive properties and dye materials containing hydroxy groups and/or containing carboxamide groups, in particular fiber materials, such as, for example, cellulose fibers, wool and synthetic polyamide fibers, in deep, fast shades by the methods known for this process.

20 Claims, No Drawings

DYESTUFFS CONTAINING PYRIMIDINE-CARBOXYLIC ACID AMIDE RADICAL HAVING FIBER-REACTIVE GROUP, PROCESSES FOR THEIR PREPARATION AND THEIR USE

DESCRIPTION

Fiber-reactive dyestuffs, processes for their preparation and their use

The invention is based on the technical field of fiber-reactive dyestuffs.

Dyestuffs which contain a halogen-substituted pyrimidine carboxylic acid amide radical, the dyestuff radical being bonded to the amide group mentioned and also directly to the pyrimidine radical, are known from German Offenlegungsschrift No. 23 14 946, British Patent Application No. 2,103,233 and U.S. Pat. No. 4,118,382. However, these known dyestuffs have deficiencies in their applications properties, in particular in respect of the depth of color achieved in the dyeings and the level of the degrees of fixing in the dyeing processes.

Improved dyestuffs have now been found with the present invention, which correspond to the formula (1)

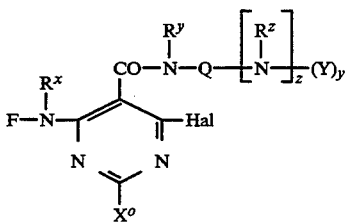

(1)

In this formula:

F is the radical of a mono-, dis- or polyazo dyestuff containing sulfo groups, or of a heavy metal complex mono-, dis- or trisazo dyestuff, or of an anthraquinone, phthalocyanine, formazan, azomethine, nitroaryl, dioxazine, phenazine or stilbene dye-stuff;

$R^x$ is hydrogen or alkyl having 1 to 4 carbon atoms, such as methyl and ethyl, preferably hydrogen, where —$N(R^x)$— can also be part of a saturated heterocyclic ring;

$R^y$ is hydrogen or alkyl having 1 to 4 carbon atoms, $R^z$ is hydrogen; such as methyl and ethyl, preferably hydrogen;

Q is phenylene, which can be substituted by 1 or 2 substituents from the group comprising alkyl having 1 to 4 carbon atoms, such as ethyl and, in particular, methyl, alkoxy having 1 to 4 carbon atoms, such as ethoxy and, in particular, methoxy, halogen, such as fluorine, chlorine and bromine, nitro, hydroxy, carboxy and sulfo, the substituents preferably being methyl, methoxy, ethoxy, carboxy and sulfo, or naphthylene, which can be substituted by 1, 2 or 3 sulfo groups and is preferably substituted by 1 or 2 sulfo groups, or Q is alkylene having 1 to 6 carbon atoms, preferably 1 to 4 carbon atoms, such as methylene, 1,2-ethylene or n-propylene, or is alkylene having 2 to 8 carbon atoms, preferably 4 to 8 carbon atoms, which is interrupted by 1 or 2 hetero groups, such as, for example, groups of the formulae —O—, —$SO_2$—, —CO—, —NH—, —CO—NH—, —NH—CO—, —$SO_2$—NH—, —NH—$SO_2$—, —$SO_2$— and —N(R)—, in which R is alkyl having 1 to 4 carbon atoms, such as methyl and ethyl, which can be substituted by hydroxy, sulfato, phosphato, sulfo or acetyloxy, or is propionyl or acetyl, or Q is alkylene-A-phenylene, phenylene-A-alkylene, alkylene-A-phenylene-A-alkylene, phenylene-A-alkylene-phenylene or phenylene-A-phenylene, in which each phenylene, independently of one another, is an optionally substituted phenylene radical described above, each alkylene, independently of one another, is an alkylene radical which is optionally interrupted by 1 or 2 hetero groups, as defined above, and each A, independently of one another, is a direct bond or one of the abovementioned hetero groups;

z is the number zero or 1, preferably zero;
y is the number 1 or 2, where y is 1 if z is 1;
Y is vinylsulfonyl, β-chloroethylsulfonyl, β-phosphatoethylsulfonyl or β-sulfatoethylsulfonyl, preferably vinylsulfonyl and, in particular, β-sulfatoethylsulfonyl;
Hal is chlorine or fluorine, preferably chlorine; and
$X^0$ is chlorine or fluorine, preferably chlorine.

Preferred dyestuffs of the formula (1) are those in which Q is the phenylene radical and the grouping —Q—$(NR^z)_z$—Y is bonded to the phenylene radical in the meta- or paraposition to the group —$N(R^x)$—. Of these, those in which $R^x$ and $R^y$ are both hydrogen and z is the number zero are particularly preferred.

F is preferably the radical of a mono- or disazo dyestuff or the radical of a heavy metal complex azo dyestuff, such as of a 1:2 chromium complex, 1:2 cobalt complex and, in particular, of a o,o'-1:1 copper complex monoazo or disazo dyestuff, or the radical of a triphendioxazine, of an anthraquinone, of a copper formazan or of a phthalocyanine dyestuff, such as of a nickel or, in particular, copper phthalocyanine dyestuff.

The dyestuff radical R has one or more, such as 2 to 6, sulfo groups. The radical F can contain other substituents customary in organic dyestuffs. Examples of such substituents are: alkyl groups having 1 to 4 carbon atoms, such as methyl, ethyl, propyl, isopropyl or butyl, and of these, preferably ethyl and, in particular, methyl; alkoxygroups having 1 to 4 carbon atoms, such as methoxy, ethoxy, propoxy, isopropoxy and butoxy, and of these preferably ethoxy and, in particular, methoxy; alkanoylamino groups having 2 to 5 carbon atoms, such as the acetylamino and propionylamino groups; benzoylamino groups which are optionally substituted by sulfo, carboxy, methyl, ethyl, methoxy, ethoxy and/or chlorine; primary and mono- or disubstituted amino groups, the substituents being, for example, alkyl groups having 1 to 4 carbon atoms and/or phenyl groups, such as monoalkylamino and dialkylamino groups having 1 to 4 carbon atoms in the alkyl radical, phenylamino or N-($C_1$-$C_4$-alkyl)-N-phenylamino groups, in which the alkyl radicals can also be substituted, for example by phenyl, sulfophenyl, hydroxy, sulfato, sulfo, and carboxy, and the phenyl groups can also be substituted, such as by chlorine, sulfo, carboxy, methyl and/or methoxy, thus, for example, methylamino, ethylamino, propylamino, isopropylamino, butylamino, N,N-di-(β-hydroxyethyl)-amino, N,N-di-(β-sulfatoethyl)-amino, sulfobenzylamino, N,N-di-(sulfobenzyl)-amino and diethylamino groups, as well as phenylamino and sulfophenylamino groups; alkoxycarbonyl groups with an alkyl radical having 1 to 4 carbon atoms, such as methoxycarbonyl and ethoxycarbonyl; alkylsulfonyl groups having 1 to 4 carbon atoms, such as methylsulfonyl and ethylsulfonyl; trifluoromethyl, nitro and cyano groups; halogen atoms, such as fluorine, chlorine and bromine; carbamoyl groups, which can be mono- and disubstituted by alkyl having 1 to 4 carbon atoms, it being possible for the alkyl radicals in turn to be substituted, for example by hydroxy, sulfato, sulfo, carboxy, phenyl and sulfophenyl, such as, for example, N-methyl-carbamoyl and N-ethyl-carbamoyl; sulfamoyl groups, which can be mono- or disubstituted by alkyl groups having 1 to 4 carbon atoms, and N-phenyl-N-alkyl-sulfamoyl groups with an alkyl group having 1 to 4 carbon atoms, wherein these alkyl groups in turn can be substituted by hydroxy, sulfato, sulfo, carboxy, phenyl and sulfophenyl, such as, for example, N-methyl-sulfamoyl, N-ethyl-sulfamoyl, N-propyl-sulfamoyl, N-iso-propyl-sulfamoyl, N-butyl-sulfamoyl, N-($\beta$-hydroxyethyl)sulfamoyl and N, N-di($\beta$-hydroxymethyl)-sulfamoyl; N-phenyl-sulfamoyl, ureido, hydroxy, carboxy, sulfomethyl and sulfo groups.

In the formula (1) and also in the following formulae, the individual formula members, both with a different and with the same meaning within a formula, can have meanings which are identical to one another or different from one another in the context of their definition.

The "sulfo", "carboxy", "phosphato" and "sulfato" groups include both the acid form thereof and the salt form thereof. Accordingly, sulfo groups are groups corresponding to the formula —$SO_3M$, carboxy groups are groups corresponding to the formula —COOM, phosphato groups are groups corresponding to the formula —$OPO_3M_2$ and sulfato groups are groups corresponding to the formula —$OSO_3M$, in which M is a hydrogen atom or a salt-forming metal atom, such as an alkali metal, such as sodium, potassium or lithium.

Important azo dyestuffs corresponding to the formula (1) are those in which F is the radical of a dyestuff of the benzene-azo-naphthol, benzene-azo-1-phenyl-5-pyrazolone, benzene-azo-benzene, naphthalene-azo-benzene, benzene-azo-aminonaphthalene, naphthalene-azo-naphthalene, naphthalene-azo-1-phenyl-5-pyrazolone, benzene-azo-pyridone and naphthalene-azo-pyridone series, the dyestuffs containing sulfo groups also being preferred here.

Of the 1:1 copper complex azo dyestuffs according to the invention, those of the benzene and naphthalene series are preferred.

Preferred mono- and disazo dyestuffs of the formula (1) are, for example those of the formulae (3a) and (3b)

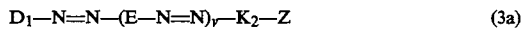  (3a)

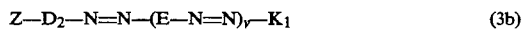  (3b)

and the heavy metal complex compounds derived therefrom, such as 1:1 copper complex compounds, in which $D_1$ is the radical of a diazo component of the benzene or naphthalene series, $D_2$ is the radical of a diazo component of the diaminobenzene or diaminonaphthalene series, E is the radical of a middle component of the benzene or naphthalene series, $K_1$ is the radical of a coupling component of the benzene, naphthalene, pyrazolone, 6-hydroxy-2-pyridone or acetoacetic acid arylamide series, $K_2$ is a radical of the aniline, aminonaphthalene or 1-aminophenyl-pyrazolone series, in which $D_1$, $D_2$, E, $K_1$ and $K_2$ can have substituents customary for azo dyestuffs, such as the substituents mentioned above for the radical F, the substituents being chosen in particular from the group of substituents comprising: hydroxy, amino, alkyl having 1 to 4 carbon atoms, such as ethyl and, in particular, methyl, alkoxy having 1 to 4 carbon atoms, such as ethoxy and methoxy, sulfo, carboxy, ureido, N'—($C_1$-$C_4$)-alkyl-ureido, such as N'-methylureido and N'-phenyl-ureido, alkanoylamino having 2 to 5 carbon atoms, such as acetylamino and propionylamino, benzoylamino, benzoylamino which is substituted by methyl, ethyl, sulfo, carboxy and/or chlorine, halogen, such as fluorine, bromine and chlorine, carbamoyl, N-phenyl-carbamoyl, sulfamoyl, N-methyl- or N-ethyl-sulfamoyl, N,N-diethylsulfamoyl, methylsulfonyl, ethylsulfonyl, trifluoromethyl and nitro, and in which the radicals $D_1$, $D_2$, E, $K_1$ and $K_2$ together have at least one, preferably at least two, sulfo groups, V is the number zero or 1 and Z is a group of the formula (2)

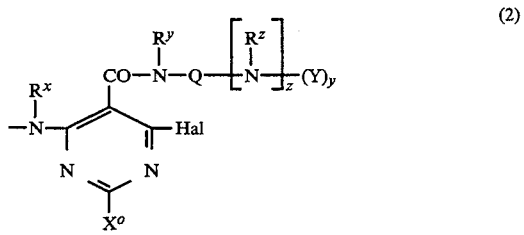  (2)

in which $R^x$, $R^y$, $R^z$, Hal, $X^0$, Q, y, z and Y have the abovementioned particularly preferred meanings.

Preferred dyestuffs are furthermore disazo dyestuffs of the formula (3c)

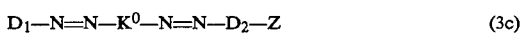  (3c)

in which Z has the abovementioned meaning, $D_1$ and $D_2$ are in each case identical to or different from one another and are each the radical of a diazo component of the benzene or naphthalene series and $K^0$ is the radical of a bivalent coupling component of the naphthalene series, in which $D_1$, $D_2$ and $K^0$ can carry the substituents customary for azo dyestuffs, such as those already mentioned above, and in which $D_1$, $D_2$ and $K^0$ together contain at least one sulfo group.

Such azo dyestuffs of the formula (1) are, in particular, dyestuffs of the formulae (3d), (3e) and (3f)

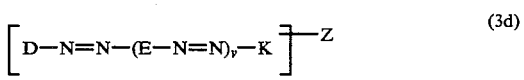  (3d)

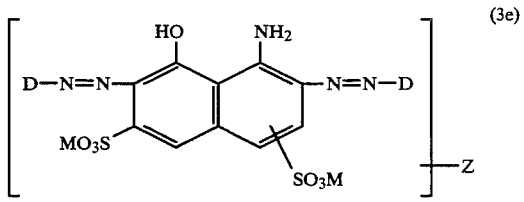  (3e)

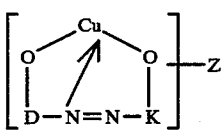

in which

Z is a radical of the formula (2) and is bonded to the radical D or the radical K, D is in each case the radical of a diazo component, to which an azo radical can also be bonded, and the two can have meanings which are identical to one another or different from one another, and D is, for example, a radical $D_1$ having the meaning above or below, E is the bivalent radical of a diazotizable compound which can undergo coupling, for example of the meaning above or below, K is the radical of a coupling component to which an azo radical can also be bonded, for example of the meaning above or below, v is the number zero or 1 and M has one of the abovementioned meanings.

Preferred metal complex azo dyestuffs according to the invention are, for example, copper complex azo dyestuffs of the formula (3g)

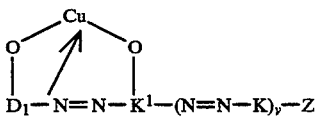

in which $D_1$, K, v and Z have one of the abovementioned meanings and $D_1$ is preferably a radical which can be seen below from the formula (5a) or (5b), and $K^1$ is the radical of a coupling component which originally contains amino and hydroxy groups, such as, preferably, the radical of an aminonaphthol which is optionally substituted by 1 or 2 sulfo groups, and in which the two oxy groups bonding the copper as a complex are bonded to $D_1$ and $K^1$ in the ortho-position or vicinal position relative to the azo group.

Aromatic radicals of diazo components which carry no fiber-reactive group of the formula (2), such as radicals of those which correspond to the formulae D—$NH_2$ or $D_1$—$NH_2$, are, for example, those of the formulae (4a), (4b), (5a) and (5b).

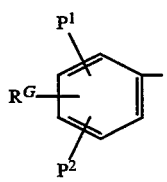

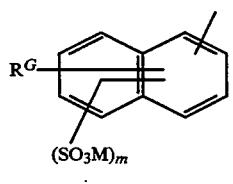

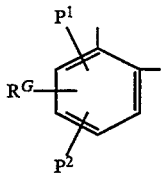

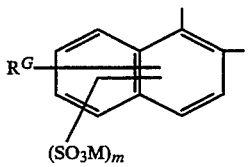

in which $R^G$ is hydrogen or sulfo, $P^1$ is hydrogen, methyl, ethyl, methoxy, ethoxy, alkanoyl having 2 to 5 carbon atoms, such as acetyl and propionyl, cyano, sulfo, carboxy, alkoxycarbonyl having 2 to 5 carbon atoms, such as methoxycarbonyl and ethoxycarbonyl, carbamoyl, N-($C_1$-$C_4$-alkyl)-carbamoyl, fluorine, chlorine, bromine or trifluoromethyl, $P^2$ is hydrogen, methyl, ethyl, methoxy, ethoxy, cyano, carboxy, sulfo, alkanoylamino having 2 to 5 carbon atoms, such as acetylamino, alkoxycarbonyl carbonyl having 2 to 5 carbon atoms, such as methoxycarbonyl and ethoxycarbonyl, carbamoyl, N-($C_1$-$C_4$-alkyl)-sulfamoyl, sulfophenylamidocarbonyl, phenylamidocarbonyl, alkylsulfonyl having 1 to 4 carbon atoms, phenylsulfonyl or phenoxy, in which the benzene nucleus in formulae (4a) and (4b) can additionally contain a hydroxy group in the ortho-position relative to the free bond which leads to the azo group, m is the number zero, 1 or 2 (this group being a hydrogen atom in the case where m is zero ) and M has the abovementioned meaning.

Preferably, of these, $P^1$ is hydrogen, methyl, methoxy, bromine, chlorine, sulfo and carboxy and $P^2$ is hydrogen, methyl, methoxy, chlorine, carboxy, sulfo, and acetylamino.

Groups of the formulae (4a) and (4b) are, for example: 2-carboxy-phenyl, 4-carboxy-phenyl, 3-carboxy-phenyl, 3-chloro-6-carboxy-phenyl, 2-sulfo-phenyl, 3-sulfophenyl, 4-sulfo-phenyl, 2,5-disulfo-phenyl, 2,4-disulfo-phenyl, 3,5-disulfo-phenyl, 2-methyl-5-sulfo-phenyl, 2-methoxy-5-sulfo-phenyl, 2-methoxy-4-sulfo-phenyl, 3-sulfo-4-methoxy-phenyl, 5-sulfo-2-ethoxy-phenyl, 4-sulfo-2-ethoxy-phenyl, 2-carboxy-5-sulfo-phenyl, 2,5-dimethoxy-4-sulfo-phenyl, 2,4-dimethoxy-5-sulfo-phenyl, 2-methoxy-5-methyl-4-sulfo-phenyl, 2-sulfo-4-methoxy-phenyl, 2-sulfo-4-methyl-phenyl, 2-methyl-4-sulfo-phenyl, 2-chloro-4-sulfo-phenyl, 2-chloro-5-sulfo-phenyl, 2-bromo-4-sulfo-phenyl, 2,6-dichloro-4-sulfo-phenyl, 2,6-dimethyl-3-sulfo-phenyl, 2,6-di-methyl-4-sulfo-phenyl, 3-acetylamino-6-sulfo-phenyl, 4-acetylamino-2-sulfo-phenyl, 4-sulfo-naphth-1-yl, 3-sulfo-naphth-1-yl,5-sulfo-naphth-1-yl,6-sulfo-naphth-1-yl, 7-sulfo-naphth-1-yl, 3,7-disulfo-naphth-1-yl, 3,6,8-trisulfo-naphth-1-yl, 4,6,8-trisulfo-naphth-1-yl, 5-sulfo-naphth-2-yl, 6- or 8-sulfo-naphth-2-yl, 3,6,8-trisulfo-naphth-2-yl, 6,8-disulfo-naphth-2-yl, 1,6-disulfo-naphth-2-yl, 1-sulfo-naphth-2-yl, 1,5-di-sulfo-naphth-2-yl, 3,6-disulfo-naphth-2-yl and 4,8-di-sulfo-naphth-2-yl.

Groups of the formula radical —Q—(NR$^z$)$_z$—Y are, for example:

2-($\beta$-sulfatoethylsulfonyl)-phenyl, 3-($\beta$-sulfatoethylsulfonyl)-phenyl, 4-($\beta$-sulfatoethylsulfonyl)-phenyl, 2-carboxy-5-($\beta$-sulfatoethylsulfonyl)-phenyl, 2-chloro-3-(sulfatoethylsulfonyl)-phenyl, 2-chloro-4-($\beta$-sulfatoethylsulfonyl)-phenyl, 2-ethoxy-4- or -5-($\beta$-sulfatoethylsulfonyl)-phenyl, 2-ethyl-4-($\beta$-sulfato-ethylsulfonyl)-phenyl, 2-methoxy-5- or -4-($\beta$-sulfato-ethylsulfonyl)-phenyl, 2,4-diethoxy-5-($\beta$-sulfatoethyl-sulfonyl)-phenyl, 2,4-dimethoxy-5-($\beta$-sulfatoethyl-sulfonyl)-phenyl, 2,5-dimethoxy-4-($\beta$-sulfatoethyl-sulfonyl)-phenyl, 2-methoxy-5-methyl-4-($\beta$-sulfatoethyl-sulfonyl)-phenyl, 2- or 3- or 4-($\beta$-thiosulfatoethyl-sulfonyl)-phenyl, 2-methoxy-5-($\beta$-thiosulfatoethyl-sulfonyl)-phenyl, 2-sulfo-4-($\beta$-phosphatoethylsulfonyl)-phenyl, 2-sulfo-4-vinylsulfonyl)-phenyl, 2-hydroxy-4- or -5- ($\beta$-sulfatoethylsulfonyl)-phenyl, 2-chloro-4- or -5- ($\beta$-chloroethylsulfonyl)-phenyl, 2-hydroxy-3-sulfo-5-($\beta$-sulfatoethyl-sulfonyl)-phenyl, 3- or 4-($\beta$-acetoxyethylsulfonyl)-phenyl, 5-($\beta$-sulfatoethylsulfonyl)-naphth-2-yl, 6- or 7- or 8-($\beta$-sulfatoethylsulfonyl)-naphth-2-yl, 6- ($\beta$-sulfatoethylsulfonyl)-1-sulfo-naphth-2-yl, 5-($\beta$-sulfatoethylsulfonyl)-1-sulfo-naphth-2-yl, 8- ($\beta$-sulfatoethylsulfonyl)-6-sulfo-naphth-2-yl, 3- or 4-{$\beta$- [4-($\beta'$-sulfatoethylsulfonyl)-phen]-ethylamino}-phenyl, 3- or 4-{$\beta$-[2'-sulfo-4'-($\beta'$-sulfatoethylsulfonyl)-phen]-ethylamino}-phenyl, 3- or 4-[$\beta$-($\beta'$-chloroethylsulfonyl)-ethylamino]-phenyl, 3- or 4-[$\beta$-($\beta'$-sulfatoethylsulfonyl)-ethylamino]-phenyl, 3- or 4-[$\beta$-(vinylsulfonyl)-ethylamino]-phenyl, 3- or 4-[$\gamma$-($\beta'$-chloroethylsulfonyl)-propylamino]-phenyl, 3- or 4-[$\gamma$-($\beta'$-sulfatoethylsulfonyl)-propylamino]-phenyl, 3- or 4-[$\gamma$-(vinylsulfonyl)-propylamino]-phenyl, 3,4-di-($\beta$-sulfatoethylsulfonyl)-phenyl, 2,5-di-($\beta$-sulfatoethylsulfonyl)-phenyl, 4-[$\gamma$-($\beta'$-sulfatoethylsulfonyl)-propoxy]-phenyl, 2,5-bis[($\beta$-sulfatoethylsulfonyl)-methyl ]-phenyl, 3- or 4-{N-[$\gamma$-$\beta'$-sulfatoethylsulfonyl)-propyl-amidocarbonyl]}-phenyl, 3,5-bis-{N-[$\gamma$-($\beta'$-sulfatoethylsulfonyl)-propyl-amidocarbonyl]}-phenyl, 3-sulfo-4- {[N-$\gamma$-($\beta'$-sulfatoethylsulfonyl)-propyl-amidocarbonyl]-methoxy}-phenyl, 4-{[N-$\gamma$-($\beta$-sulfatoethylsulfonyl)-propyl-amidocarbonyl] -methoxy}-phenyl, 3- or 4-[N-methyl- or 3- or 4-[N-ethyl-N-($\beta$-sulfatoethylsulfonyl)-amido]-phenyl, $\beta$-($\beta'$-sulfatoethylsulfonyl)-ethyl, $\gamma$-($\beta'$-sulfatoethylsulfonyl)-propyl, $\ominus$-($\beta'$-chloroethylsulfonyl)-ethyl, $\gamma$-($\beta'$-chloroethyl-sulfonyl)-propyl, $\beta$-[$\beta'$-($\beta''$-chloroethylsulfonyl)-ethoxy]-ethyl and $\beta$-[$\beta'$-($\beta''$-sulfatoethylsulfonyl)-ethoxy]-ethyl.

Aromatic radicals Z—D— and Z—D$_2$— from compounds of the formulae Z—D—NH$_2$ and Z—D$_1$—NH$_2$ which serve as diazo components or from diaminobenzene and diaminonaphthalene compounds thereof corresponding to the formulae H$_2$N—D—NH$_2$ and H$_2$N—D$_2$—NH$_2$ are preferably radicals of the formulae (6a) and (6b)

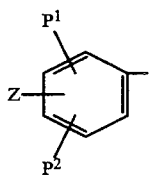

(6a)

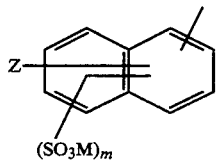

(6b)

in which Z, M, m, P$^1$ and P$^2$ have the abovementioned particularly preferred meanings, and in which the particular benzene nucleus can additionally contain a hydroxy group in the ortho-position relative to the free bond leading to the azo group.

Aromatic radicals E of a diazotizable compound of the formula H—E—NH$_2$ which can undergo coupling are, for example, those of the formulae (7a), (7b) and (7c)

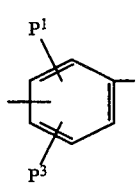

(7a)

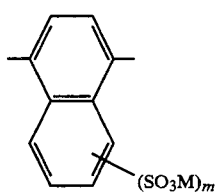

(7b)

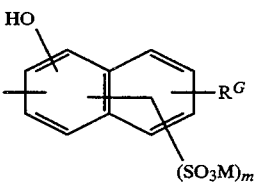

(7c)

in which

P$^1$ M and m have the abovementioned meanings and P$^3$ is hydrogen, alkyl having 1 to 4 carbon atoms, such as methyl or ethyl, alkoxy having 1 to 4 carbon atoms, such as methoxy and ethoxy, chlorine, alkanoylamino having 2 to 5 carbon atoms, such as acetylamino and propionylamino, benzoylamino, ureido, phenylureido, alkylureido having 1 to 4 carbon atoms in the alkyl radical, phenylsulfonyl or alkylsulfonyl having 1 to 4 carbon atoms.

Radicals K and K$_1$ of coupling components of the formula H—K and H—K$_1$ which carry no fiber-reactive group of the formula (2) are, for example, those of the formulae (8a ) to (8h)

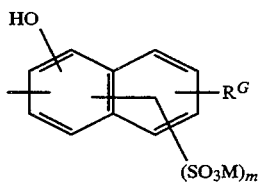

(8c)

-continued

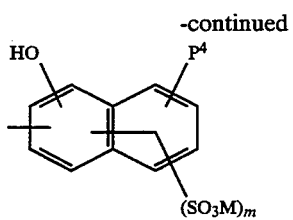
(8b)

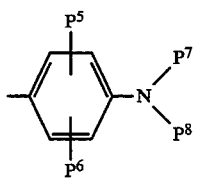
(8c)

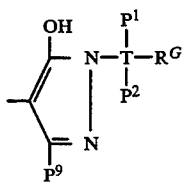
(8d)

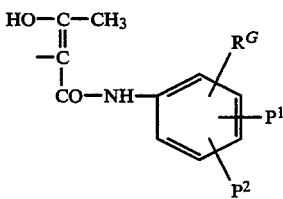
(8e)

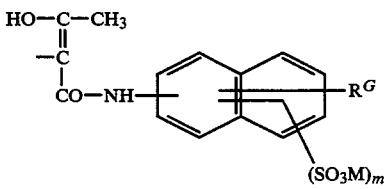
(8f)

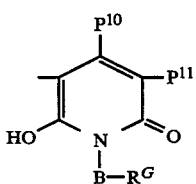
(8g)

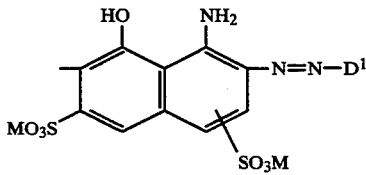
(8h)

in which $R^G$, $P^1$, $P^2$, m and M have the abovementioned meanings, $P^4$ is phenylureido, which can be substituted in the phenyl radical by substituents from the group comprising chlorine, methyl, methoxy, sulfo and carboxyl, or is benzoylamino, which can be substituted in the benzene radical by substituents from the group comprising chlorine, methyl, methoxy, nitro, sulfo and carboxyl, $P^5$ is hydrogen, alkyl having 1 to 4 carbon atoms, such as methyl and ethyl, alkoxy having 1 to 4 carbon atoms, such as methoxy and ethoxy, bromine, chlorine or alkanoylamino having 2 to 7 carbon atoms, such as acetylamino and propionylamino, $P^6$ is hydrogen, alkyl having 1 to 4 carbon atoms, such as methyl and ethyl, alkoxy having 1 to 4 carbon atoms, such as methoxy and ethoxy, chlorine or alkanoylamino having 2 to 7 carbon atoms, such as acetylamino and propionylamino, ureido or phenylureido, $P^7$ is hydrogen or alkyl having 1 to 4 carbon atoms, which can be substituted by hydroxyl, cyano, carboxyl, sulfo, sulfato, methoxycarbonyl, ethoxycarbonyl or acetoxy, $P^8$ is alkyl having 1 to 4 carbon atoms, which can be substituted by hydroxyl, cyano, carboxyl, sulfo, sulfato, methoxycarbonyl, ethoxycarbonyl or acetoxy, or is benzyl or phenyl or phenyl which is substituted by alkyl having 1 to 4 carbon atoms, alkoxy having 1 to 4 carbon atoms, chlorine and/or sulfo, $P^9$ is hydrogen, alkyl having 1 to 4 carbon atoms, such as methyl, cyano, carboxyl, carbalkoxy having 2 to 5 carbon atoms, such as carbomethoxy and carboethoxy, carbamoyl or phenyl, preferably methyl, carboxyl, methoxycarbonyl, ethoxycarbonyl or phenyl, and in particular methyl or carboxyl, T is a benzene or naphthalene ring, preferably a benzene ring, $P^{10}$ is hydrogen or alkyl having 1 to 4 carbon atoms, such as methyl, or alkyl having 1 to 4 carbon atoms which is substituted by alkoxy having 1 to 4 carbon atoms, such as methoxy, or cyano, or is phenyl, preferably alkyl having 1 to 4 carbon atoms or phenyl, $P^{11}$ is hydrogen, chlorine, bromine, sulfo, carbamoyl, methylsulfonyl, phenylsulfonyl, cyano or sulfoalkyl having 1 to 4 carbon atoms, preferably hydrogen, sulfo, sulfoalkyl with an alkyl radical having 1 to 4 carbon atoms, such as sulfomethyl, cyano or carbamoyl, B is alkylene having 1 to 4 carbon atoms, methylenephenylene, ethylenephenylene, phenylenemethylene, phenyleneethylene or phenylene, or methylenephenylene, ethylenephenylene or phenylene which is substituted in the benzene radical by fluorine, chlorine, bromine, methyl, methoxy, cyano, sulfo, carboxy, acetyl, nitro, carbamoyl and/or sulfamoyl and $D^1$ is a radical of the formula (4a) or (4b).

Radicals —K—Z and —$K_2$—Z of coupling components of the formula H—K—Z and H—$K_2$—Z or H—K—N($R^x$)H and H—$K_1$—N($R^x$)H in which the fiber-reactive radical corresponding to the grouping $Z^1$ mentioned later must be introduced subsequently are, for example, radicals of the formulae (9a) to (9h)

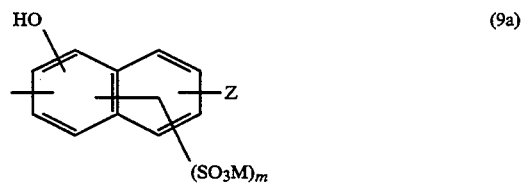
(9a)

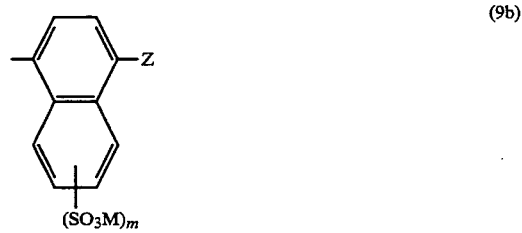
(9b)

-continued

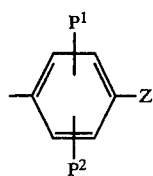
(9c)

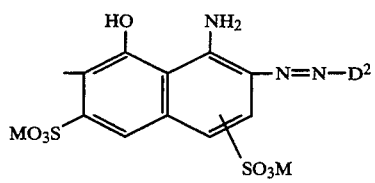
(9d)

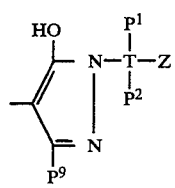
(9e)

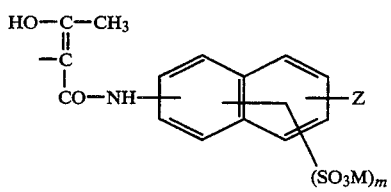
(9f)

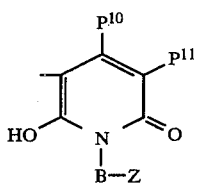
(9g)

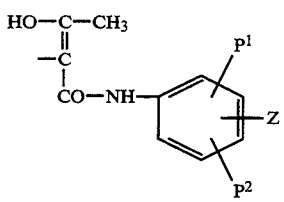
(9h)

in which

P$^1$, P$^2$, P$^9$, P$^{10}$, P$^{11}$, B, T, M, m and Z have the abovementioned particularly preferred meanings and D$^2$, as the radical of a diazo component, is a radical of the formula (6a) or (6b) mentioned above and defined.

In the above formulae (8a), (8b) and (9a), the free bond leading to the azo group is bonded to the aromatic nucleus in the ortho-position relative to the hydroxy group.

Radicals K and K$^1$ in the formulae (3f) and (3g) which have an oxygen atom which forms a metal complex and contain the group Z are, in particular, those of the formulae (10a) to (10e)

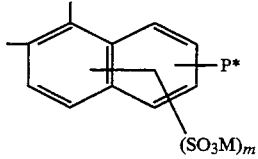
(10a)

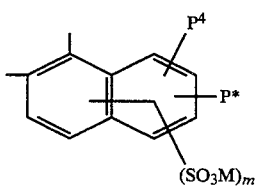
(10b)

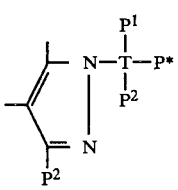
(10c)

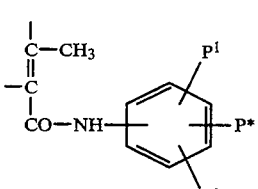
(10d)

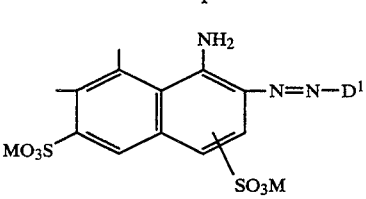
(10e)

in which the individual formula members have one of the abovementioned meanings and P* is either a radical Z or a grouping of the formula —N=N—K—Z.

Azo dyestuffs which are furthermore preferred are those which correspond to the formulae (12A) to (12R)

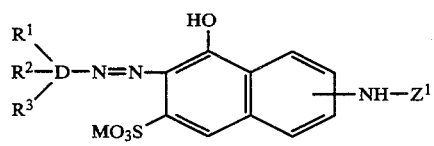
(12A)

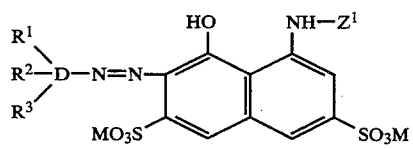
(12B)

-continued
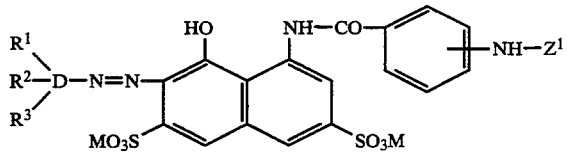
(12C)
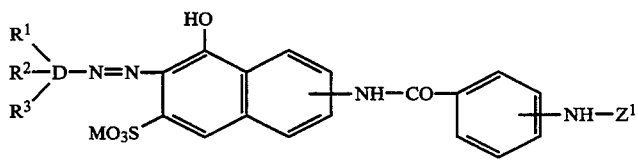
(12D)
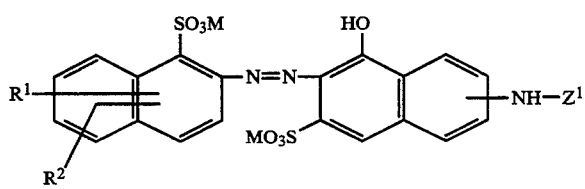
(12E)
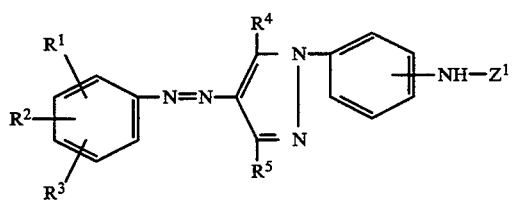
(12F)
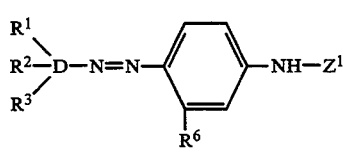
(12G)
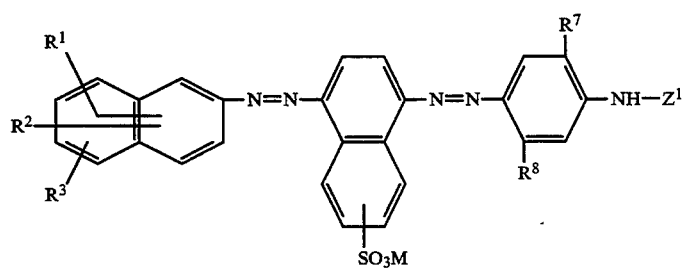
(12H)
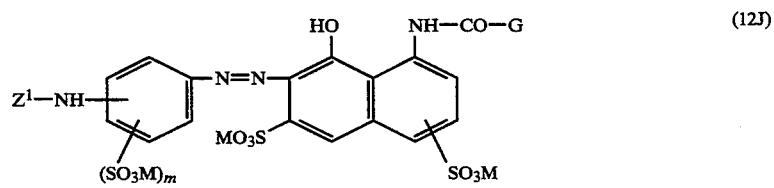
(12J)
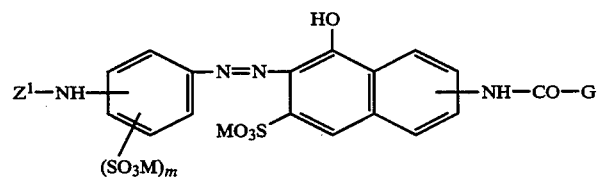
(12K)

-continued

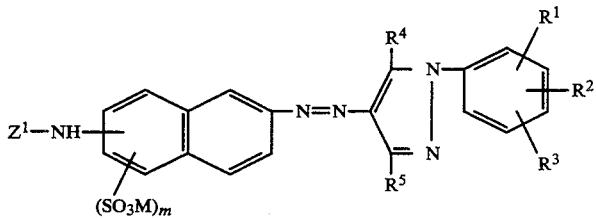
(12L)

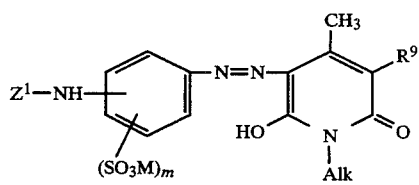
(12M)

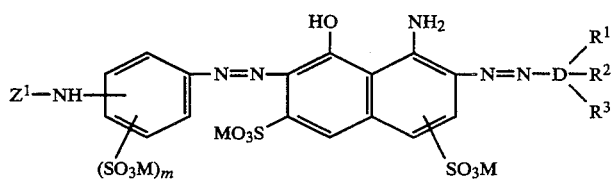
(12N)

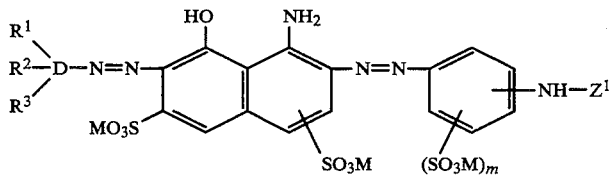
(12P)

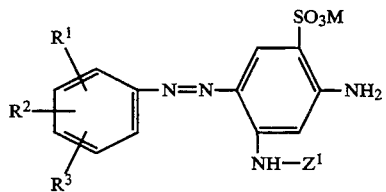
(12Q)

in which:

$Z^1$ is a radical of the formula

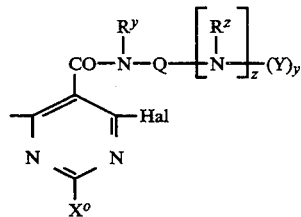
(3A)

in which $X^0$, Hal, Q, $R^y$, $R^z$, Y, z and Y have the abovementioned particularly preferred meanings;

M has one of the abovementioned meanings;

D is a benzene ring or is a naphthalene ring, in which the azo group is preferably bonded to the naphthalene ring in the $\beta$-position and in which, in the case where D is the naphthalene ring, $R^2$ and $R^3$ preferably each independently of one another are a hydrogen atom or a sulfo group;

$R^1$ is hydrogen or sulfo;

$R^2$ is hydrogen, alkyl having 1 to 4 carbon atoms, such as ethyl and, in particular, methyl, alkoxy having 1 to 4 carbon atoms, such as ethoxy and, in particular, methoxy, halogen, such as chlorine and bromine, carboxy or sulfo, and is preferably hydrogen;

$R^3$ is hydrogen, alkyl having 1 to 4 carbon atoms, such as ethyl and, in particular, methyl, alkoxy having 1 to 4 carbon atoms, such as ethoxyand, in particular, methoxy, halogen, such as chlorine and bromine, carboxy or sulfo, preferably hydrogen;

$R^4$ is hydroxy or amino, preferably hydroxy;

$R^5$ is methyl, carboxy, carbomethoxy or carboethoxy, preferably methyl or carboxy;

$R^6$ is acetylamino, ureido or methyl;

$R^7$ is hydrogen, alkyl having 1 to 4 carbon atoms, such as methyl and ethyl, alkoxy having 1 to 4 carbon atoms, such as methoxy and ethoxy, or halogen, such as bromine and, in particular, chlorine, preferably hydrogen, methyl, ethyl, methoxy, ethoxy or chlorine;

$R^8$ is hydrogen or alkyl having 1 to 4 carbon atoms, such as methyl and ethyl, alkanoylamino having 2 to 5 carbon atoms, such as acetylamino and propionylamino, or ureido, preferably hydrogen, methyl, ethyl, methoxy, ethoxy, acetylamino or ureido;

$R^9$ is hydrogen, cyano, carbamoyl, sulfamoyl or sulfomethyl, preferably hydrogen or carbamoyl;

$R^{10}$ is cyano, carbamoyl or sulfomethyl;

Alk is alkyl having 1 to 4 carbon atoms, such as methyl and ethyl, or alkyl having 2 to 4 carbon atoms, such as ethyl and propyl, which can be substituted by hydroxy, carboxy, sulfo or sulfato;

G is alkyl having 1 to 4 carbon atoms, such as ethyl and propyl, or is benzoyl or benzoyl which is substituted by sulfo, carboxy and/or alkyl having 1 to 4 carbon atoms, such as methyl;

m is the number zero, 1 or 2 (and in the case where m is zero, this group is hydrogen); and in the compounds of the formulae (12A), (12D), (12E) and (12K), the amino or amido grouping is bonded to the 8-naphthol radical in the 2- or 3-position.

Anthraquinone dyestuffs according to the invention which are to be mentioned in particular are those which correspond to the formula (13)

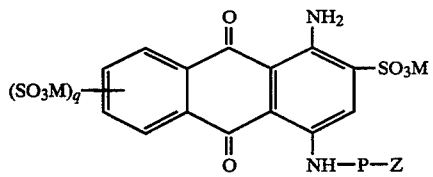

in which

M and Z have one of the abovementioned meanings,

P is phenylene which can be substituted by 1, 2, 3 or 4 substituents from the group comprising alkyl having 1 to 4 carbon atoms, such as methyl and ethyl, alkoxy having 1 to 4 carbon atoms, such as methoxy and ethoxy, halogen, such as chlorine and bromine, carboxy and sulfo, or is alkylene having 1 to 4 carbon atoms, such as methylene and ethylene, or is -alk-NH-alk- or -phen-NH-alk-, in which phen is optionally substituted phenylene and alk is alkylene having 1 to 4 carbon atoms, such as methylene and ethylene, or P is optionally substituted cyclohexylene and q is the number zero or 1 (this group being hydrogen in the case where q is zero).

Triphendioxazine dyestuffs according to the invention which are to be emphasized are those which correspond to the formula (14)

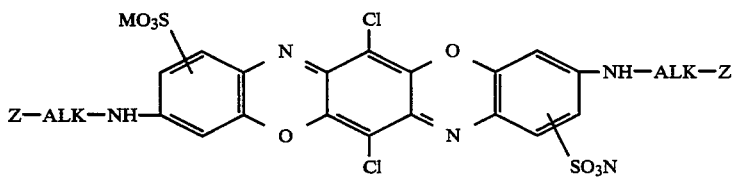

in which M and Z have one of the abovementioned meanings and ALK is alkylene having 2 to 6 carbon atoms, which can be interrupted by 1 or 2 hetero groups and/or can be substituted, or is cyclohexylene, the two sulfo groups —SO₃M preferably being bonded to the benzene nucleus in the ortho-position relative to the oxygen atom of the heterocyclic ring.

Preferred phthalocyanine dyestuffs according to the invention are those which correspond to the formula (15)

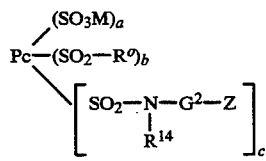

in which:

Pc is the radical of a copper phthalocyanine or nickel phthalocyanine;

$R^0$ is an amino group of the formula —NR$^{11}$R$^{12}$ in which R$^{11}$ and R$^{12}$ independently of one another are hydrogen or alkyl having 1 to 4 carbon atoms, which can be substituted by hydroxy or sulfo, or is a heterocyclic N-containing radical, such as the morpholino or piperidino radical;

$R^{14}$ is hydrogen or alkyl having 1 to 4 carbon atoms, such as methyl and ethyl;

$G^2$ is phenylene, which can be substituted by 1 or 2 substituents from the group comprising alkyl having 1 to 4 carbon atoms, such as ethyl and methyl, halogen, such as chlorine and bromine, carboxy and sulfo, for example sulfophenylene, or is alkylene having 2 to 6 carbon atoms, such as ethylene;

Z is the fiber-reactive group of the formula (2);

a is a number from zero to 3, b is a number from zero to 3 and c is a number from 1 to 2, and in which the sum of (a+b+c) is a number from 2 to 4.

Copper formazan dyestuffs according to the invention are, in particular, those which correspond to the formula (16)

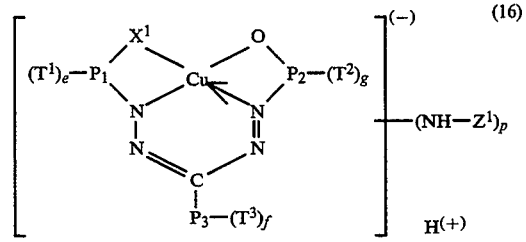

in which:

$X^1$ is an oxygen atom or, preferably, the carbonyloxy group of the formula —COO—;

P₁ and P₂ independently of one another are each a benzene or naphthalene ring, in which the nitrogen atom and the group $X^1$ are bonded to P$^1$ in the ortho-position relative to one another and the oxygen atom and the nitrogen atom are bonded to P$^2$ in the ortho-position relative to one another and the benzene nuclei or naphthalene nuclei can be further substituted by one or two substituents from the group comprising halogen, such as chlorine, nitro, alkyl having 1 to 4 carbon atoms, methoxy, ethoxy, sulfamoyl, sulfamoyl which is mono- or disubstituted by alkyl having 1 to 4 carbon atoms, alkylsulfonyl having 1 to 4 carbon atoms, such as methylsulfonyl and ethylsulfonyl, P₁ and P₂ both preferably being a benzene ring;

P₃ is a straight-chain or branched alkylene group having 2 to 6 carbon atoms, preferably 2 to 4 carbon atoms, which can be substituted by a sulfophenyl group, or is a phenylene group or a naphthylene group, which can be substituted by 1 or 2 substituents from the group comprising methyl, ethyl, methoxy, ethoxy and chlorine, $P_3$ preferably being a benzene ring;

$T^1$, $T^2$ and $T^3$ independently of one another are each a sulfo or carboxy group, preferably a sulfo group;

e, f and g independently of one another are each the number zero, 1 or 2, the sum of (e+f+g) being an integer from 1 to 4 and is preferably 2 or 3, in particular 2, and the group $T^1$, $T^2$ or $T^3$ being a hydrogen atom in the case where e or f or g is zero; and p is the number 1 or 2, preferably 1, and in which the group —NH—$Z^1$ can be bonded to an aromatic radical of $P^1$, $P^2$ or $P^3$, and is preferably bonded to $P_2$.

Preferred copper formazan dyestuffs of the formula (16) are those in which $P_1$ and $P_2$ are both a benzene ring, the group —NH—$Z^1$ is bonded to $P_2$ and $T^1$ and $T^2$ are each a sulfo group, and in which e and g are both the number 1. If the group —NH—$Z^1$ is bonded to $P^1$, e is the number zero, g is the number 2 and $T^2$ is a sulfo group. The grouping —$P_3$—($T^3$)$_f$ furthermore is preferably the phenyl or a 2- or 4-sulfo-phenyl radical.

The present invention furthermore relates to processes for the preparation of the dyestuffs of the formula (1) according to the invention. They can be prepared in a manner which is customary per se and is analogous to the known synthesis routes specific for the particular class of dyestuff, by reacting typical precursors for the particular dyestuff, at least one of which contains a group of the formula (2), with one another, or by starting from a starting compound containing an amino group, of the formula (20)

(20)

in which F and $R^x$ have the abovementioned meanings, and reacting this with a halogeno-pyrimidine-carboxylic acid amide compound of the formula (21)

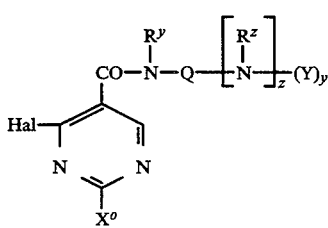
(21)

in which Hal, $X^0$, $R^y$, $R^z$, Q, y, z and Y have the abovementioned meanings.

The reaction of the starting compounds of the formulae (20) and (21) is carried out in an aqueous or aqueous-organic medium in suspension or solution. If the reactions are carried out in an aqueous-organic medium, the organic medium is, for example, acetone, dimethylformamide, dimethylsulfoxide or N-methyl-pyrrolidone. The hydrogen halide liberated during the condensation is advantageously neutralized continuously by addition of aqueous alkali metal hydroxides, carbonates or bicarbonates.

The reaction of the compounds of the formula (20) with a compound of the formula (21) is as a rule carried out at a pH of between 2 and 7, preferably between 3 and 5, and at a temperature of between 30° and 100° C., preferably between 40° and 80° C.

The halogeno-pyrimidine-carboxylic acid amide compounds of the formula (21) can be prepared from trihalogeno-pyrimidine-4-carboxylic acid halides of the formula (22)

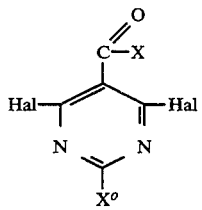
(22)

in which Hal and $X^0$ have the abovementioned meanings and X is bromine or, preferably, chlorine, and an amino compound of the formula (23)

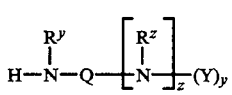
(23)

in which $R^y$, $R^z$, Q, y, z and Y have the abovementioned meanings, analogously to known procedures for the reaction of carboxylic acid halides with amines, i.e. as stated for the abovementioned reactions, in an aqueous or aqueous-organic medium at a pH of between 2 and 11, preferably between 3 and 9, and at a temperature of between 0° and 30° C., preferably between 5° and 20° C.

The halogeno-pyrimidine-carboxylic acid halide compounds of the formula (22) are known in some cases; their preparation is described in German Offenlegungsschrift 29 29 594. Such starting compounds are, for example, 2,4-dichloro-6-fluoro-pyrimidine-5-carbonyl fluoride, 4,6-dichloro-2-fluoro-pyrimidine-5-carbonyl fluoride, 2,4,6-trichloro-pyrimidine-5-carbonylfluoride, 4-chloro-2,6-difluoro-pyrimidine-5-carbonyl fluoride, 2-chloro-4,6-difluoro-pyrimidine-5-carbonyl fluoride, 2,4,6-trifluoro-pyrimidine-5-carbonyl fluoride and, in particular, 2,4,6-trichloro-pyrimidine-5-carbonyl fluoride.

Starting compounds of the formula (20) are, for example: 6-amino-1-hydroxy-2-(2'-sulfophenylazo)-naphthalene-3-sulfonic acid, 6-methylamino-1-hydroxy-2-(4'-acetyl-amino-2'-sulfo-phenylazo)-naphthalene-3-sulfonic acid, 8-amino-1-hydroxy-2-(2'-sulfo-phenylazo)-naphthalene-3,6-disulfonic acid, 8-amino-1-hydroxy-2-(4'-chloro-2'-sulfo-phenylazo)-naphthalene-3,5-disulfonic acid, 7-amino-2-(2',5'-disulfo-phenylazo)-1-hydroxynaphthalene-3-sulfonic acid, 7-methylamino-2-(2'-sulfo-phenylazo)-1-hydroxynaphthalene-3-sulfonic acid, 7-methylamino-2-(4'-methoxy-2'-sulfo-phenylazo)-1-hydroxynaphthalene-3-sulfonic acid, 8-(3'-aminobenzoylamino)-1-hydroxy-2-(2'-sulfo-phenylazo)-naphthalene-3,6-disulfonic acid, 8-amino-1-hydroxy-2,2'-azonaphthalene-1',3,5',6-tetrasulfonic acid, 8-amino-1-hydroxy-2,2'-azonaphthalene-1',3,5'-trisulfonic acid, 6-amino-1-hydroxy-2,2'-azonaphthalene-1',3,5'-trisulfonic acid, 6-methylamino-1-hydroxy-2,2'-azonaphthalene-1',3,5,'-trisulfonic acid, 7-amino-1-hydroxy-2,2'-azonaphthalene-1',3-disulfonic acid, 8-amino-1-hydroxy-2-(4'-methyl-2'-sulfo-phenylazo)-naphthalene-3,6-disulfonic acid, 6-amino-1-hydroxy-2-(2'-methyl-2'-sulfo-phenylazo)-naphthalene- 3,5-disulfonic acid, 8-amino-1-hydroxy-2-[4'-(2''-sulfo-phenylazo)-2'-methoxy-5'-methylphenylazo]-naphthalene-3,6-disulfonic acid, 8-amino-1-hydroxy-2-[4'-(4''-methoxy-phenylazo)-2'-carboxy-phenylazo]-naphthalene-3,6-disulfonic acid, 8-amino-1-hydroxy-2-[4'-(2''-hydroxy-3'',6''-disulfo-1'''-naphthylazo)-2'-carboxy-phenylazo]-naphthalene-3,6-disulfonic acid, 4,4'-bis-(8''-amino-1'''-hydroxy-3'',6''-disulfo-2''-naphthylazo)-3,3'-dimethoxydiphenyl, 6-amino-1-hydroxy-2-[4'-(2''-sulfo-phenylazo)-2'-methoy-5'-methyl-phenylazo]-naphthalene-3,5-disulfonic acid, 2-(4'-amino-2'-methyl-phenylazo)-naphthalene-4,8-disulfonic acid, 2-(4'-amino-2'-acetylamino-phenylazo)-naphthalene-5,7-disulfonic acid, 4-nitro-4'-(4''-methylamino-phenylazo)-stilbene-2,2'-disulfonic acid, 4-nitro-4'-(4''-amino-2''-methyl-5''-methoxy-phenylazo)-stilbene-2,2'-disulfonic acid, 4-amino-4'-(4''-methoxy-phenylazo)-stilbene-2,2,-disulfonic acid, 4-amino-2-methyl-azobenzene-2',5'-disulfonic acid, 1-(2',5'-dichloro-4'-sulfo-phenyl)-3-methyl-4-(3''-amino-6''-sulfo-phenylazo)-5-pyrazolone, 1-(4'-sulfo-phenyl)-3-carboxy-4-(4''-amino-2''-sulfo-phenylazo)-5-pyrazolone, 1-(2'-methyl-5'-sulfo-phenyl)-3-methyl-4-(4''-amino-2''-sulfo-phenylazo)-5-pyrazolone, 1-(2'-sulfophenyl)-3-methyl-4-(3''-amino-6''-sulfo-phenylazo)-5-pyrazolone, 4-amino-4'-(3''-methyl-1''-phenyl-4''-pyrazol-5''-onyl-azo)-stilbene-2,2'-disulfonic acid, 4-amino-4'-(2''-hydroxy-3'',6''-disulfo-1'''-naphthylazo)-stilbene-2,2'-disulfonic acid, 8-acetylamino-1-hydroxy-2-(3'-amino-6'-sulfophenylazo)-naphthalene-3,6-disulfonic acid, 7-(3'-sulfo-phenylamino)-1-hydroxy-2-(4''-amino-2''-carboxy-phenylazo)-naphthalene-3-sulfonic acid, 8-phenylamino-1-hydroxy-2-(4'-amino-2'-sulfo-phenylazo)-naphthalene-3,6-disulfonic acid, 6-acetylamino-1-hydroxy-2-(3,-amino-6'-sulfo-phenylazo)-naphthalene-3-sulfonic acid, 1-(3'-amino-phenyl)-3-methyl-4-(2'',5''-disulfo-phenylazo)-5-pyrazolone, 1-(3'-aminophenyl)-3-carboxy-4-(2''-carboxy-4''-sulfo-phenylazo)-5-pyrazolone, 4-amino-4'-[3''-methyl-4''-(2''',5'''-disulfo-phenylazo)-1''-pyrazol-5''-onyl] -stilbene-2,2'-disulfonic acid and 1-(3'-amino-phenyl)-3-carboxy-4-[4''-(2''',5'''-disulfo-phenylazo)-2''-methoxy-5''-methylphenylazo]-5-pyrazolone, the copper complex of 8-amino-1-hydroxy-2-(2'-hydroxy-5'-sulfo-phenylazo)-naphthalene-3,6-disulfonic acid, of 6-amino-1-hydroxy-2-(2'-hydroxy-5'-sulfo-phenylazo)-naphthalene-3-sulfonic acid, of 6-amino-1-hydroxy-2-(2'-hydroxy-5'-sulfo-phenylazo)-naphthalene-3,5-disulfonic acid, of 8-amino-1-hydroxy-2-(2'-hydroxy-3'-chloro-5'-sulfo-phenylazo)-naphthalene-3,6-disulfonic acid, of 6-methylamino-1-hydroxy-2-(2'-carboxy-5'-sulfo-phenylazo)-naphthalene-3-sulfonic acid, of 8-amino-1-hydroxy-2-[4'-(2''-sulfo-phenylazo)-2'-methoxy-5'-methyl-phenylazo]-naphthalene-3,6-disulfonic acid, of 6-amino-1-hydroxy-2-[4'-(2'',5''-disulfo-phenylazo)-2'-methoxy-5'-methylphenylazo]-naphthalene-3,5-disulfonic acid, of 1-(3'-amino-4'-sulfophenyl)-3-methyl-4-[4''-(2''',5'''-disulfo-phenylazo-2''-methoxy-5''-methyl-phenylazo]-5-pyrazolone, of 7-(4'-amino-3'-sulfo-anilino)-1-hydroxy-2-[4''-(2''',5'''-disulfo-phenylazo)-2''-methoxy-5''-methyl-phenylazo]-naphthalene-3-sulfonic acid and of 6-(4'-amino-3'-sulfo-anilino)-1-hydroxy-2-(2''-carboxy-phenylazo)-naphthalene-3-sulfonic acid, the 1:2 chromium complex of 7-amino-6'-nitro-1,2'-dihydroxy-2,1'-azo-naphthalene-3,4'-disulfonic acid, of 6-amino-1-hydroxy-2-(2'-carboxy-phenylazo)-naphthalene-3-sulfonic acid of 8-amino-1-hydroxy-2-(4'-nitro-2'-hydroxy-phenylazo)-naphthalene-3,6-disulfonic acid of 1-(3'-amino-4'-sulfo-phenyl)-3-methyl-4-(2''-hydroxy-4''-sulfo-1'''-naphthylazo)-5-pyrazolone and of 7-(4'-sulfo-anilino)-1-hydroxy-2-(4'''-amino-2''-carboxy-phenylazo)-naphthalene-3-sulfonic acid, the 1:2 cobalt complex of 6-(4'-amino-3'-sulfo-anilino)-1-hydroxy-2-(5''-chloro-2''-hydroxy-phenylazo)-naphthalene-3-sulfonic acid, the copper formazan compounds of N-(2-carboxy-4-sulfophenyl)-N'-(2'-hydroxy-3'-amino-5'-sulfophenyl)-ms-phenyl-formazan, N-(2-carboxy-4-sulfophenyl)-N'-(2'-hydroxy-5'-amino-3'-sulfophenyl)-ms-phenyl-formazan, N-(2-carboxy-5-sulfophenyl)-N' -(2'-hydroxy-5'-amino-3'-sulfophenyl)-ms-(4''-sulfo-phenyl)-formazan, N-(2-carboxy-4-sulfophenyl)-N'-( 2'-hydroxy-5'-amino-3'-sulfophenyl)-ms-(4''-sulfo-phenyl)-formazan,N-(2-carboxy-5-sulfophenyl)-N'-(2'-hydroxy-3'-amino-5'-sulfophenyl)-ms-(4''-methoxy-phenyl)-formazan, N-(2-carboy-4-sulfophenyl)-N'-hydroxy-3'-amino-5'-sulfophenyl)-ms-(2''-chloro-5''sulfophenyl)-formazan, N-(2-carboxy-4-aminophenyl)-N'-(2'-hydroxy-3',5'-disulfonylphenyl)-ms-(3''-sulfophenyl-formazan, N-(2-carboxy-4-aminophenyl)-N'-(2'-hydroxy-3',5'-disulfonylphenyl)-ms-(2''-sulfophenyl)-formazan, N-(2-carboxy-4-aminophenyl)-N'-(2'-hydroxy-5'-methyl-sulfonyl-3'-sulfophenyl)-ms-(2''-sulfophenyl)-formazan, N-(2-carboxy-5-sulfophenyl)-N'-(2'-hydroxy-3',5'-disulfophenyl)-ms-(3''-aminophenyl)-formazan, N-(2-carboxy-5-sulfophenyl)-N'-(2'-hydroxy-4'-methylsulfophenyl-6'-sulfophenyl)-ms-(3''-amino-phenyl)-formazan, N-(2-carboxy-4-aminophenyl)-N'-(2'-hydroxy-4'-sulfonaphth-1'-yl)-ms-(2''-sulfophenyl)-formazan, N-(2-hydroxy-3-amino-5-sulfophenyl)-N'-(2'-hydroxy-4'-sulfophenyl)-ms-(2''-sulfophenyl)-formazan, N-(2-hydroxy-3-amino-5-sulfophenyl)-N'-(2'-hydroxy-3',5'-disulfophenyl)-ms-phenyl-formazan, N-(2-hydroxy-5-sulfophenyl)-N'-(2'-hydroxy-3',5'-disulfophenyl)-ms-(4''-aminophenyl)-formazan, N-(2-hydroxy-3-amino-5-sulfophenyl)-N'-(2'-hydroxy-3',5'-disulfophenyl)-ms-phenyl-formazan, N-(2-hydroxy-3-amino-5-sulfophenyl)-N'-(2'-hydroxy-3',5'-disulfophenyl)-ms-(4''-sulfophenyl-formazan, N-(2-hydroxy-5-amino-3-sulfophenyl)-N'-(2',5'-disulfophenyl)-ms-phenyl-formazan, N-(2-hydroxy-4,6-disulfophenyl)-N'-(2',4'-disulfophenyl)-ms-(3''-aminophenyl)-formazan and of N-(2-hydroxy-4-sulfophenyl)-N'-(4'-amino-2'-sulfophenyl)-ms-(4''-chloro-3''-sulfophenyl)-formazan, the amino anthraquinone compounds 1-amino-4-(3'-amino-2',4',6'-trimethylphenylamino)-anthraquinone-2,5'-disulfonic acid, 1-amino-4-(2',6'-dimethyl-3'-aminomethyl-phenylamino)-anthraquinone-2,5'-disulfonic acid, 1-amino-4-(4'-methyl-2'-aminomethylphenylamino)-anthraquinone-2,6'-disulfonic acid, 1-amino-4-(5'-amino-phenylamino)-anthraquinone- 2,2',4'-trisulfonic acid, 1-amino-4-(4'-amino-phenylamino)-anthraquinone-2,3'-disulfonic acid, 1-amino-4-(4'-amino-phenylamino)-anthraquinone-2,2'-disulfonic acid, 1-amino-4-(3'-amino-phenylamino) -anthraquinone-2,4'-disulfonic acid, 1-amino-4-(2'-methyl-3'-amino-phenylamino)-anthraquinone-2,5'-disulfonic acid, 1-amino-4-(2'-methyl-3'-amino-phenylamino) -anthraquinone-2,6,5'-trisulfonic acid, 1-amino-4- (5'-aminomethylphenylamino)-anthraquinone-2,2',4'-trisulfonic acid, 1-amino-4-(4'-amino-cyclohexylamino)-anthraquinone-2,6-disulfonic acid, 1-amino-4-(4'-amino-cyclohexylamino)-anthraquinone-2-sulfonic acid, 1-amino-4-(3'-amino-4'-methyl-cyclohexylamino)-anthraquinone-2-sulfonic acid, 1-amino-4-(3'-amino-2'-methyl-cyclohexylamino)-anthraquinone-2-sulfonic acid, 1-amino-4-(4'-amino-3'-methyl-cyclohexylamino)-anthraquinone-2-sulfonic acid, 1-amino-4-(4'-aminomethyl-cyclohexylamino)-anthraquinone-2-sulfonic acid, 1-amino-4-(3'-aminomethyl-cyclohexylamino)-anthraquinone-2-sulfonic acid, 1-amino-4-(2'-amino-ethylamino)-anthraquinone-2-sulfonic acid, 1-amino-4-(2'-methylaminoethylamino)-anthraquinone-2-sulfonic acid, 1-amino-4-(3'-amino-1-propylamino)-anthraquinone-2-sulfonic acid, 1-amino-4-(3'-methylamino-1-propylamino)-anthraquinone-2-sulfonic acid and 1-amino-4-(4'-amino-1-butylamino)-anthraquinone-2-sulfonic acid, the triphendioxazine compounds of the formula (24)

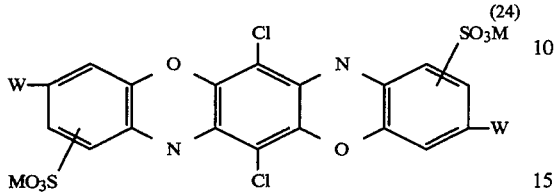

(24)

in which M has one of the abovementioned meanings and W is 3-amino-propylamino, 2-amino-2-methyl-ethylamino, 4-amino-butylamino, 5-amino-pentylamino, 6-amino-hexylamino, 4-amino-cyclohexylamino, N-piperazinyl, 3-amino-2-sulfato-propylamino, 2-[(N-acetyl)-N-(2'-amino-ethyl)amino]-ethylamino, 2-(2'-amino-ethoxy)-ethylamino or N-methyl-(2-N'-methyl-amino)-ethylamino, and the copper phthalocyanine and nickel phthalocyanine compounds (preferably in the form of their salts) containing amino groups of the following formulae (in which Pc is the copper phthalocyanine or nickel phthalocyanine radical):

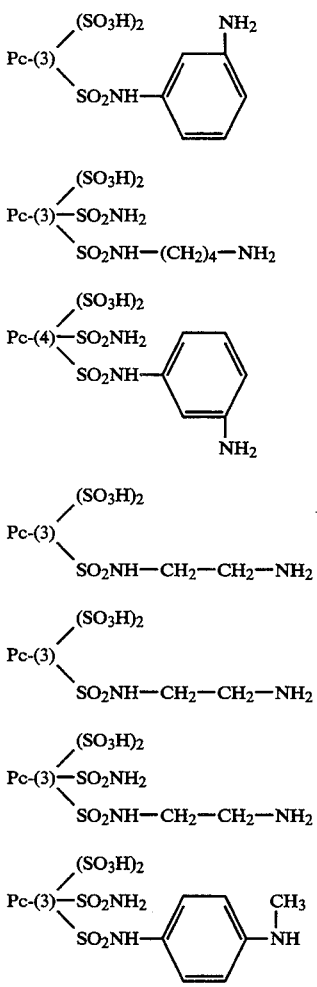

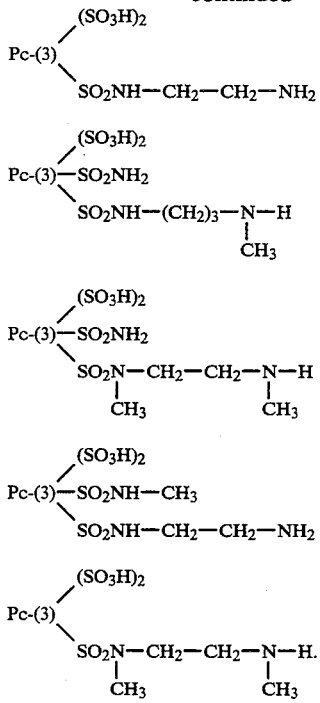

Aromatic amines which are used as diazo components for the synthesis of the azo dyestuffs of the formula (1) according to the invention and corresponding to the formula $D-NH_2$ or $D_1-NH_2$, are, for example: 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 4-amino-phenyl, 1-aminobenzene-2-, -3- or -4-carboxylic acid, 2-aminodiphenyl ether, 1-aminobenzene-2-, -3- or -4-sulfonic acid amide, -N-methylamide, -N-ethylamide, -N,N-dimethylamide or -N,N-diethylamide, dehydrothio-p-toluidine-sulfonic acid, 1-amino-3-trifluoromethyl-benzene-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or 4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4-or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1,4-diaminobenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-3,6- or -5,7-disulfonic acid, 1-aminonaphthalene-3,6- or -5,7-disulfonic acid, 2-amino-naphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7, -3,6,8 or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-4-sulfonic acid, 2-amino-1-hydroxynaphthalene-4,8-disulfonic acid, 4-aminoazabenzene-3,4'-disulfonic acid, 3-methoxy-4-amino-6-methylazobenzene-2',4'-disulfonic acid and 3-methoxy-4-amino-6-methylazobenzene-2',5'-disulfonic acid.

Starting compounds which are first used as coupling component for the preparation of disazo dyestuffs of the formula (1) according to the invention and are then used as diazo component in the form of the amino-azo compound formed and correspond to the formula H—E—NH$_2$ are, for example 3-methyl-aniline, 2-methoxy-5-methyl-aniline, 2,5-dimethyl-aniline,3-ureido-aniline, 3-acetylamino-aniline, 3-(hydroxyacetylamino)-aniline, 1,3-diaminobenzene-4-sulfonic acid, 1-amino-naphthalene-6- or -8-sulfonic acid, 1-amino-2-methoxy-naphthalene-6-sulfonic acid, 2-amino-5-hydroxy-naphthalene-7-sulfonic acid, 2-amino-5-hydroxy-naphthalene-1,7-disulfonic acid and 2-amino-8-hydroxy-naphthalene-6-sulfonic acid.

Starting compounds for the preparation of the azo compounds of the formula (1) according to the invention which are used as coupling components and correspond to the formulae H—K or H—K$_1$ or the formulae H—K—N(R$^x$)H or H—K$_2$—N(R$^x$)H are, for example: phenol, 1-hydroxy-3- or -4-methylbenzene, 1-hydroxybenzene-4-sulfonic acid, 1-hydroxynaphthalene, 2- hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic aid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- and 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- and -4,6-disulfonic acid, 1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)- 8-hydroxynaphthalene-3,6- or -4,6-disulfonic acid, 2-(4'-amino-3'-sulfophenylamino)-5-hydroxynaphthalene-7-sulfonic acid, 3-methyl-5-pyrazolone, 1-phenyl-3-methyl-5-pyrazolone, 1-(4'-sulfophenyl)-3-methyl-5-pyrazolone, 1-(4'-sulfophenyl)-5-pyrazolone-3-carboxylic acid, 1-(3'-aminophenyl)-3-methyl-5-pyrazolone, 1-(2',5'-disulfophenyl)-3-methyl-5-pyrazolone, 1-(2'-methyl-4'-sulfophenyl)-5-pyrazolone-3-carboxylic acid, 1-(4',8'-disulfonaphth-2'-yl)-3-methyl-5-pyrazolone, 1-(5',7'-disulfonaphth-2'-yl)-3-methyl-5-pyrazolone, 1-(2',5'-dichloro-4'-sulfophenyl)-3-methyl-5-pyrazolone, 3-aminocarbonyl-4-methyl-6-hydroxy-2-pyridone, 1-ethyl-3-cyano- or -3-chloro-4-methyl-6-hydroxy-2-pyridone, 1-ethyl-3-sulfomethyl-4-methyl-6-hydroxy-2-pyridone-, 2,4,6-triamino-3-cyanpyridine, 2-(3'-sulfophenylamino)-4,6-diamino-3-cyanpyridine, 2-(2'-hydroxyethylamino)-3-cyano-4-methyl-6-aminopyridine, 2,6-bis-(2'-hydroxyethylamino)-3-cyano-4-methylpyridine, 1-ethyl-3-carbamoyl-4-methyl-6-hydroxy-2-pyridone, 1-ethyl-3-sulfomethyl-4-methyl-5-carbamoyl-6-hydroxy-2-pyridone, N-acetylaminobenzene, 1-(N-acetoacetylamino)-2-methoxybenzene-5-sulfonic acid, 4-hydroxy-2-quinolone, 1-amino-8-hydroxy-7-(phenylazo)-naphthalene-3,6-disulfonic acid, 1-amino-8-hydroxy-7-(4'-sulfophenylazo)-naphthalene-3,6-disulfonic acid and 1-amino-8-hydroxy-7-(2',5'-disulfophenylazo)naphthalene-3,6-disulfonic acid.

Amino starting compounds of the formula (23) are, for example: 1-aminobenzene-2-, -3- or -4-β-sulfatoethylsulfone, 1-aminobenzene-3-β-phosphatoethylsulfone, 1-amino-4-methylbenzene-3-β-sulfatoethylsulfone, 1-aminobenzene-3-β-chloroethylsulfone, 1-amino-4-methoxybenzene-3-β-sulfatoethylsulfone, 1-aminobenzene-4-β-sulfatoethylsulfone-2-sulfonic acid, 1-aminobenzene-5-β-sulfatoethylsulfone-2-sulfonic acid, 1-aminobenzene-5-β-sulfatoethylsulfone-2,4-disulfonic acid, 1-aminonaphthalene-4-β-sulfatoethylsulfone, 1-amino-2,5-dimethoxybenzene- 4-β-sulfatoethylsulfone, 1-aminobenzene-4-β-sulfatoethylsulfone-2-carboxylic acid, 1-aminobenzene-5-β-sulfatoethylsulfone-2-carboxylic acid, 1-amino-2-methoxybenzene-4-β-sulfatoethylsulfone, 1-amino-2-chlorobenzene-4-β-sulfatoethylsulfone, 1-amino-2-methoxybenzene-5-β-sulfatoethylsulfone, 2-aminonaphthalene-8-β-sulfatoethylsulfone, 2-aminonaphthalene-8-β-sulfatoethylsulfone-6-sulfonic acid, 1-amino-2,5-dimethoxybenzene-4-vinylsulfone, 1-amino-2-methoxy-5-methoxybenzene-4-β-sulfatoethylsulfone, 1-amino-2,5-diethoxybenzene-4-β-sulfatoethylsulfone, 1-amino-2-bromobenzene-4-β-sulfatoethylsulfone, 1-amino-2-bromobenzene-4-vinylsulfone, 1-aminobenzene-5-vinylsulfone-2,4-disulfonic acid, 1-aminobenzene-5-β-phosphatoethylsulfone-2,4-disulfonic acid, 1-aminobenzene-5-β-chloroethylsulfone-2,4-disulfonic acid, 2-aminonaphthalene-8-β-phosphatoethylsulfone-6-sulfonic acid, 2-aminonaphthalene-8-vinylsulfone-6-sulfonic acid, 1-amino-2-methoxy-5-methylbenzene-4-β-chloroethylsulfone, 2-aminophenyl-4-β- sulfatoethylsulfone, 1-aminobenzene-3- or -4-vinylsulfone, 1-amino-2-hydroxybenzene-4-β-sulfatoethylsulfone, 1-aminobenzene-5-vinylsulfone-2-sulfonic acid, 3-(N-methyl-β-sulfatoethylsulfonylamino)-1-aminobenzene, 3-(N-ethyl-β-sulfatoethylsulfonylamino)-1-aminobenzene, 3-β-sulfatoethylsulfonylamino-1-aminobenzene, β-(β'-chloroethylsulfonyl)-ethylamine, γ-(β'-chloroethylsulfonyl)-propylamine, γ-(β'-sulfatoethylsulfonyl)-propylamine, β-[β'-(β''-chloroethylsulfonyl)-ethoxy]-ethylamine, β-[β'-(β''-sulfatoethylsulfonyl)-ethoxy]-ethylamine, 8-(β-sulfatoethylsulfonyl)-6-sulfo-2-aminonaphthalene, 3- or 4-{β-[(β'-sulfatoethylsulfonyl)-phen]-ethylamino}-aniline, 3- or 4-{β-[2'-sulfo-4'-(β'-sulfatoethylsulfonyl)-phen]-ethylamino}-aniline, 3- or 4-[β-(β'-chloroethylsulfonyl)-ethylamino]-aniline, 3- or 4-[β-(β'-sulfatoethylsulfonyl)-ethylamino]-aniline, 3 or 4-[β-(vinylsulfonyl)-ethylamino]-aniline, 3- or 4-[γ-(β'-chloroethylsulfonyl)-propylamino]-aniline, 3- or 4-[γ-(β'-sulfatoethylsulfonyl)-propylamino]-aniline, 3- or 4-[γ-(vinylsulfonyl)-propylamino]-aniline, 3,4-di-(β-sulfatoethylsulfonyl)-aniline, 2,5-di-(β-sulfatoethylsulfonyl)-aniline, 4-[γ-(β'-sulfatoethylsulfonyl)-propoxy]-aniline, 2,5-bis-[(β-sulfatoethylsulfonyl)-methyl]-aniline, 3- or 4-{N-[γ-(β'-sulfatoethylsulfonyl)-propyl-amidocarbonyl]}-aniline, 3,5-bis-{N-[γ-(β'-sulfatoethylsulfonyl)-propyl-amidocarbonyl]}-aniline, 3-sulfo-4-{[N-γ-(β'-sulfatoethylsulfonyl)-propyl-amidocarbonyl]-methoxy}-aniline and 4-{[N-γ-(β'-sulfatoethylsulfonyl)-propyl-amidocarbonyl]-methoxy}-aniline.

If diazo or coupling components which already contain the group of the formula (3) are used as starting substance in the synthesis according to the invention of the azo dyestuffs, the reactions are carried out by the customary procedure of diazotization and coupling reactions, i.e. the diazotization is as a rule carried out a temperature of between $-5°$ C. and $+15°$ C. and at a pH below 2 by means of a strong acid and alkali metal nitrite in a preferably aqueous medium, and the coupling reaction is as a rule carried out at a pH of between 1.5 and 4.5 in the case of a coupling component containing amino groups and at a pH between 3 and 7.5 in the case of a coupling component containing hydroxyl groups, and at a temperature of between 0° and 25° C., likewise preferably in an aqueous medium.

For the synthesis according to the invention of heavy metal complex azo dyestuffs, for example those corresponding to the formula (3j), as a rule those azo compounds which are free from heavy metals and contain a phenolic or naphtholic hydroxy group bonded in the ortho-position or vicinal position relative to the azo group in the coupling component and in which the diazo component radical contains a hydrogen atom or a hydroxy group or a lower alkoxy group, such as a methoxy group, bonded in the ortho-position relative to the azo group are used as starting substances, it being possible for the starting azo compounds which are free from heavy metals furthermore to contain an acylamino radical in bonded form, such as an acetylamino radical. For example, the synthesis of copper complex azo dyestuffs of the formula (4j) can be carried out starting from a starting compound corresponding to the formula (25)

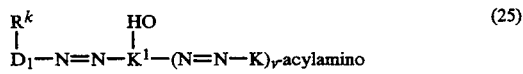
(25)

in which $D_1$, K, $K^1$ and v have one of the abovementioned meanings and are $R^k$ is a hydrogen atom or a hydroxy or methoxy group bonded to $D_1$ in the ortho-position relative to the azo group, and this starting azo compound containing an acylamino group can be reacted with a copper-donating agent, such as a copper salt, analogously to known and customary procedures. If $R^k$ is a hydrogen atom or a methoxy group, the compound (25) can be subjected to an oxidative or dealkylating coppering reaction which is to be carried out by the customary route. The copper complex azo compound with the acylamino group now obtained can then be reacted with a compound of the formula (21) or (24) analogously to known procedures, after or with hydrolysis of the acylamino group to the amino group, to give the dyestuff of the formula (1) according to the invention.

The dyestuffs of the formula (1)—called dyestuffs (1) below—are suitable for dyeing and printing the most diverse materials, such as silk, leather, wool, polyamide fibers and polyurethanes, and in particular all types of cellulosic fiber materials. Such fiber materials are, for example, the naturally occurring cellulose fibers, such as cotton, linen and hemp, as well as cellulose and regenerated cellulose. The dyestuffs (1) are also suitable for dyeing or printing fibers which contain hydroxyl groups and are contained in blended fabrics, for example mixtures of cotton with polyester fibers or polyamide fibers.

The dyestuffs (1) can be applied to the fiber material and fixed on the fiber in various ways, in particular in the form of aqueous dyestuff solutions and printing pastes. They are suitable both for the exhaust process and for dyeing by the pad-dyeing process in which the goods are impregnated with aqueous, optionally salt-containing dyestuff solutions and the dyestuff is fixed, after treatment with an alkali or in the presence of an alkali, if appropriate under the action of heat. The dyestuffs according to the invention are particularly suitable for the so-called cold pad-batch process, in which the dyestuff is applied on the padder together with the alkali and is then fixed by storage at room temperature for several hours. After fixing, the dyeings or prints are rinsed thoroughly with cold and hot water, if appropriate with addition of an agent which has a dispersing action and promotes diffusion of the non-fixed portions. These dyeing and printing processes are described in numerous instances in the general technical literature and also in the patent literature, such as, for example, in the publications mentioned at the beginning.

The present invention therefore also relates to the use of the dyestuffs (1) for dyeing (including printing) these materials and to processes for dyeing (and printing) such materials in a procedure which is customary per se, in which a dyestuff (1) is employed as the colorant, by applying the dyestuff (1) to the material in an aqueous medium and fixing it on the material by means of heat or by means of an alkaline compound or by means of both.

If anthraquinone dyestuffs according to the invention display an inadequate solubility in the alkaline dye liquor, this deficiency can be eliminated in the manner known from the literature by addition of dispersing agents or other non-colored compounds, for example a naphthalenesulfonic acid/formaldehyde condensate or, in particular, anthraquinone-2-sulfonic acid.

The dyestuffs (1) are distinguished by a high reactivity, a good fixing capacity and a very good build-up capacity. They can therefore be employed by the exhaust dyeing process at low dyeing temperatures and require only short steaming times in the pad-steam process. The degrees of fixing are high, and the non-fixed portions can easily be washed out, the difference between the degree of exhaustion and degree of fixing being remarkably small, i.e. the soaping loss is very low. The dyestuffs (1) are particularly suitable for printing, above all on cotton, but also for printing nitrogen-containing fibers, for example wool or silk or blended fabrics containing wool or silk.

The dyeings and prints produced with the dyestuffs (1) have, especially on cellulose fiber materials, a good depth of color and a high fiber/dyestuff bond stability both in the acid and in the alkaline range, and furthermore a good fastness to light and very good wet-fastness properties, such as fastnesses to washing, water, seawater, cross-dyeing and perspiration, as well as a good fastness to pleating, fastness to ironing and fastness to rubbing.

The following Examples serve to illustrate the invention. The parts and percentages are by weight, unless stated otherwise. Parts by weight bear the same relation to parts by volume as the kilogram to the liter.

The compounds described by way of their formulae in these Examples are shown in the form of the free acid; they are in general prepared and isolated in the form of their alkali metal salts, such as lithium, sodium or potassium salts, and are used for dyeing in the form of their salts. The starting compounds and components mentioned in the form of the free acid in the following Examples, in particular the Tabular Examples, likewise can be employed in the synthesis as such or in the form of their salts, preferably alkali metal salts.

The absorption maxima ($\lambda_{max}$) in the visible range stated for the dyestuffs according to the invention were determined with the aid of their alkali metal salts in aqueous solution. In the Tabular Examples, the $\lambda_{max}$ values are shown in parentheses against the color shade; the wavelength stated is in nm.

Example A

A solution of 12.35 parts of trichloropyrimidine-5-carbonyl chloride in 200 parts by volume of acetone is stirred into a suspension of 12.12 parts of $\gamma$-($\beta$-sulfatoethylsulfonyl)-propylamine in 250 parts by volume of acetone at 0° C. The reaction is carried out at 5° to 10° C., while maintaining a pH of 6.5 by means of 15% strength aqueous sodium carbonate solution. The trichloro-pyrimidine-5-carboxylic acid compound thus obtained of the formula

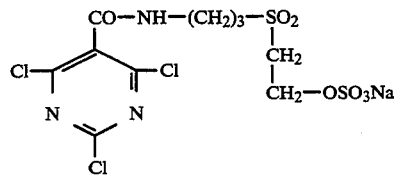

is isolated by evaporation of the solution under reduced pressure. The compound is a solid substance; it is characterized by the following $^{13}$C-NMR spectroscopy values in hexadeutero-dimethyl sulfoxide: $\delta$ (in ppm)=21.7; 37.9; 51.2; 52.3; 60.0; 129.4; 157.5; 159.4; 160.6 compared with tetramethylsilane as the internal standard.

Example B

Trichloropyrimidine-5-carboxylic acid amide compounds, as starting compounds which can be employed according to the invention for the preparation of dyestuffs of the formula (1), can be obtained analogously in accordance with the information in Example A if, instead of the $\gamma$-($\beta$-sulfatoethylsulfonyl)-propylamine starting compound employed here, another amine corresponding to the formula (23), such as an amine described in the description part of the present patent application, such as, in particular, for example, 3-($\beta$-sulfatoethylsulfonyl)-aniline, 4-($\beta$-sulfatoethylsulfonyl)-aniline, 2-methoxy-5-($\beta$-sulfatoethylsulfonyl)-aniline, 2-methoxy-5-methyl-4-($\beta$-sulfatoethylsulfonyl)-aniline, $\beta$-($\beta$-sulfatoethylsulfonyl)-ethylamine or $\beta$-($\beta$-chloroethylsulfonyl)ethylamine is employed.

Example 1

21 parts of an amino-azo compound prepared by the customary route by coupling of the diazonium salt of 2-sulfo-4-methoxy-aniline to 3-amino-6-sulfo-8-naphthol are added to the 2,4,6-trichloro-5-carboxylic acid N-[$\gamma$-($\beta'$-sulfatoethylsulfonyl)-propyl]-amide solution prepared under Example A and the reaction is carried out at 60° C. for three hours, while maintaining a pH of 5. The azo dyestuff according to the invention prepared, of the formula (written in the form of the free acid)

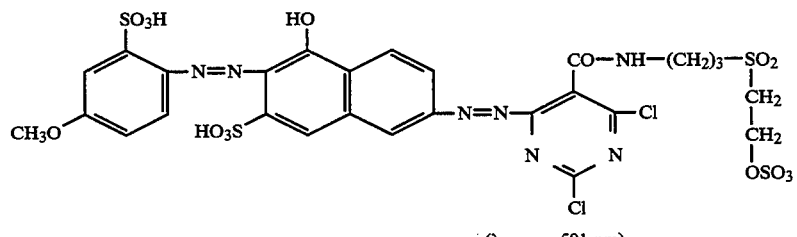

($\lambda_{max}$ = 501 nm)

is then isolated as the alkali metal salt (sodium salt) in the customary manner by salting out with sodium chloride. The bonding of the amino group of the amino-azo radical in the 4-position of the pyrimidine radical was confirmed by $^{13}$C-NMR spectroscopy.

The azo dyestuff according to the invention has very good fiber-reactive dyestuff properties and dyes the materials mentioned in the description, in particular cellulose fiber materials, in deep, brilliant scarlet red shades with good fastness properties by the application processes customary in the art for fiber-reactive dyestuffs.

Example 2

26 parts of the amino-azo starting compound 5-(1',5'-disulfo-naphth-2'-yl)-azo-3-amino-6-sulfo-8-naphthol are added to the 2,4,6-trichloro-5-carboxylic acid N-[γ-(β'-sulfatoethylsulfonyl)-propyl]-amide solution prepared in accordance with the information of Example A. The reaction is carried out at a temperature of 70° C. for 4 hours, while maintaining a pH of 5. The azo dyestuff according to the invention, of the formula (written in the form of the free acid)

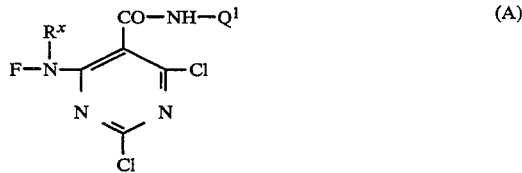

(A)

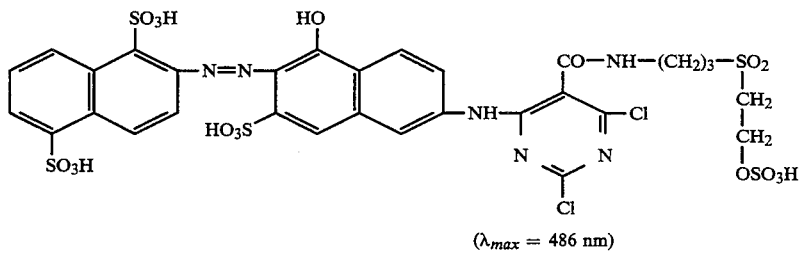

($\lambda_{max}$ = 486 nm)

is isolated as the sodium salt in the customary manner by salting out using sodium chloride. It has very good fiber-reactive dyestuff properties and dyes the fiber materials mentioned in the description, in particular cotton, in deep orange shades with good fastness properties.

Examples 3 to 130

Further dyestuffs according to the invention corresponding to a formula (A) are described in the following Tabular Examples with the aid of their starting compounds containing amino groups (a dyestuff radical containing amino groups, corresponding to the formula (20), and an amine of the formula $H_2N$—$Q^1$ corresponding to the formula (23)). They can be prepared in the manner according to the invention, for example analogously to the abovementioned Examples, using 2,4,6-trichloro-pyrimidine-5-carbonyl chloride, the amino starting compound corresponding to the formula (20), which can be seen from the particular Tabular Example, and the amino compound corresponding to the formula $H_2N$—$Q^1$ (the mono- and disazo dyestuffs containing amino groups as the starting compound of the formula (20) are shown in the Table by their diazo and coupling components in the customary form of characterization). These novel dyestuffs have very good fiber-reactive dyestuff properties and dye the materials mentioned in the description, in particular cellulose fiber materials, such as cotton, in the color shade mentioned in the particular Tabular Example (for cotton here) in a good depth of color and with good fastnesses.

| | Starting amino compounds of the formula | | |
|---|---|---|---|
| Ex. | F—N($R^x$)H | $H_2N$—$Q^1$ | Color shade |
| 3 | N-(2-Carboxy-5-sulfophenyl)-N'-(2'-hydroxy-3'-amino-5'-sulfophenyl)-ms-phenyl-formazan (Cu-complex) | γ-(β'-sulfatoethyl-sulfonyl)-propylamine | blue (608) |
| 4 | 2-Naphthylamine-3,6,8-trisulfonic acid → 3-aminophenylurea | γ-(β'-sulfatoethyl-sulfonyl)-propylamine | (417) |
| 5 | 2-Naphthylamine-4,8-disulfonic acid → 1-amino-acetylaminobenzene | γ-(β'-sulfatoethyl-sulfonyl)-propylamine | (418) |
| 6 | 1-Amino-4-(3'-amino-2',4',6'-trimethylphenyl-amino)-anthraquinone-2,5'-disulfonic acid | γ-(β'-sulfatoethyl-sulfonyl)-propylamine | blue (622) |
| 7 | 2-Naphthylamine-4,6,8-trisulfonic acid → 1-naphthylamine-6-sulfonic acid → 3-methyl-aniline | γ-(β'-sulfatoethyl-sulfonyl)-propylamine | (445) |
| 8 | 2-Naphthylamine-1,5-disulfonic acid → 1-amino-8-naphthol-3,6-disulfonic acid | γ-(β'-sulfatoethyl-sulfonyl)-propylamine | (536) |
| 9 | 2-Aminonapthalene-1,5-disulfonic acid → 1-amino-3-acetylaminobenzene | 1-aminobenzene-3-β-sulfatoethylsulfone | reddish-tinged yellow |
| 10 | 2-Aminonapthalene-1,5-disulfonic acid → 3-amino-phenylurea | 1-aminobenzene-3-β-sulfatoethylsulfone | reddish-tinged yellow |
| 11 | 2-Aminonaphthalene-1,5-disulfonic acid → 1-amino-3-hydroxyacetylaminobenzene | 1-aminobenzene-4-β-sulfatoethylsulfone | reddish-tinged yellow |
| 12 | 2-Aminonaphthalene-5,7-disulfonic acid → 1-amino-3-acetylaminobenzene | 1-aminobenzene-3-sulfatoethylsulfone | reddish-tinged yellow |
| 13 | 2-Aminonaphthalene-5,7-disulfonic acid → 3-aminophenylurea | 1-aminobenzene-4-β sulfatoethylsulfone | reddish-tinged yellow |
| 14 | 2-Aminonaphthalene-4,8-disulfonic acid → 1-amino-3-methylbenzene | 1-aminobenzene-3-β sulfatoethylsulfone | yellow |
| 15 | 2-Aminonaphthalene-4,8-disulfonic acid → | 1-aminobenzene-3-β | yellow |

-continued

| Ex. | Starting amino compounds of the formula F—N(R$^x$)H | H$_2$N—Q$^1$ | Color shade |
|-----|------|------|------|
|  | 1-amino-3-acetylaminobenzene | sulfatoethylsulfone | |
| 16 | 2-Aminonaphthalene-3,6-disulfonic acid → 1-amino-3-acetylaminobenzene | 1-aminobenzene-3-β-sulfatoethylsulfone | reddish-tinged yellow |
| 17 | 2-Aminonaphthalene-3,6-disulfonic acid → 3-aminophenylurea | 1-aminobenzene-3-β-sulfatoethylsufone | reddish-tinged yellow |
| 18 | 2-Aminonaphthalene-6,8-disulfonic acid → 1-amino-3-acetylaminobenzene | 1-aminobenzene-3-β-sulfatoethylsufone | reddish-tinged yellow |
| 19 | 2-Aminonaphthalene-6,8-disulfonic acid → 1-amino-2-methoxynaphthalene-6-sulfonic acid | 1-aminobenzene-3-β-sufatoethylsufone | reddish-tinged yellow |
| 20 | 2-Aminonaphthalene-3,6,8-trisulfonic acid → 1-amino-3-acetylaminobenzene | 1-aminobenzene-3-β-sulfatoethylsulfone | reddish-tinged yellow |
| 21 | 2-Aminonaphthalene-3,6,8-trisulfonic acid → 3-aminophenylurea | 1-aminobenzene-3-β-sulfatoethylsufone | reddish-tinged yellow |
| 22 | 2-Aminonaphthalene-3,6,8-trioulfonic acid → 1-amino-3-methylbenzene | 1-aminobenzene-3-β-sulfatoethylsufone | reddish-tinged yellow |
| 23 | 2-Aminonaphthalene-4,6,8-trisulfonic acid → 1-amino-3-methylbenzene | 1-aminobenzene-3-β-sulfatoethylsulfone | reddish-tinged yellow |
| 24 | 2-Aminonaphthalene-4,6,8-trisulfonic acid → 1-amino-3-acetylaminobenzene | 1-aminobenzene-3-β-sulfatoethylsulfone | reddish-tinged yellow |
| 25 | 1-Aminobenzene-2,5-disulfonic acid → 1-aminonaphthalene-6-sulfonic acid | 1-aminobenzene-3-β-sulfatoethylsufone | reddish-tinged yellow |
| 26 | 1-Aminobenzene-2,5-disulfonic acid → 1-aminonaphthalene-6-sulfonic acid → 1-aminonaphthalene-8-sulfonic acid | 1-aminobenzene-3-β-sulfatoethylsulfone | reddish-tinged brown |
| 27 | 1-Aminonaphthalene-2,5,7-trisulfonic acid → 1-aminonaphthalene-6-sulfonic acid → 1-aminonaphthalene-8-sulfonic acid | 1-aminobenzene-3-β-sulfatoethylsufone | violet-tinged brown |
| 28 | 1-Aminonaphthalene-2,5,7-trisulfonic acid → 1-amino-2,5-dimethylbenzene → 1-aminonaphthalene-6-sulfonic acid | 1-aminobenzene-3-β-sulfatoethylsulfone | reddish-tinged brown |
| 29 | 4-Aminoazobenzene-3,4'-disulfonic acid → 1-aminonaphthalene-6-sulfonic acid | 1-aminobenzene-3-β-sulfatoethylsulfone | yellow-brown |
| 30 | 1,4-Diaminobenzene-2,5'-disulfonic acid → 1-ethyl-3-sulfomethyl-4-methyl-6-hydroxy-2-pyridone-5-carboxamide | 1-amino-4-methyl benzene-3-β-sulfatoethylsulfone | yellow |
| 31 | 1-Amino-3-acetylaminobenzene-6-sulfonic acid → 1-ethyl-3-sulfomethyl-4-methyl-6-hydroxy-2-pyridone-5-carboxamide (hydrolyzed) | 3-(β-sulfatoethylsulfonyl-aniline | yellow |
| 32 | 1-Amino-3-acetylaminobenzene-6-sulfonic acid → 1-ethyl-3-aminocarbonyl-4-methyl-6-hydroxy-2-pyridone (hydrolyzed) | 1-aminobenzene-4,β-sulfatoethylsulfone | yellow |
| 33 | 1-Amino-3-acetylaminobenzene-6-sulfonic acid → 1-(2',5'-dichloro-4'-sulfophenyl)-3-methyl-5-pyrazolone (hydrolyzed) | 1-aminobenzene-4,β-sulfatoethylsulfone | yellow |
| 34 | 1-Amino-3-acetylaminobenzene-6-sulfonic acid → 1-(2',5'-disulfophenyl)-3-methyl-5-pyrazolone (hydrolyzed) | 1-aminobenzene-4,β-sulfatoethylsulfone | yellow |
| 35 | 1-Amino-3-acetylaminobenzene-6-sulfonic acid → 1-(4'-sulfophenyl)-3-carboxy-5-pyrazolone (hydrolyzed) | 1-aminobenzene-4-β-sulfatoethylsulfone | yellow |
| 36 | 1-Amino-3-acetylaminobenzene-6-sulfonic acid → 1-(2'-methyl-4'-sulfophenyl)-3-carboxy-5-pyrazolone (hydrolyzed) | 1-aminobenzene-4-β-sulfatoethylsulfone | yellow |
| 37 | 1-Amino-3-acetylaminobenzene-6-sulfonic acid → 1-(4',8'-disulfonaphth-2'-yl)-3-methyl-5-pyrazolone (hydrolyzed) | 1-aminobenzene-4-β-sulfatoethylsulfone | yellow |
| 38 | 1-Aminobenzene-2,5-disulfonic acid → 1-(3'-aminophenyl)-3-methyl-5-pyrazolone (hydrolyzed) | 1-aminobenzene-4-β-sulfatoethylsulfone | yellow |
| 39 | 1-Aminobenzene-2,5-disulfonic acid → 2-acetylamino-5-hydroxynaphthalene-7-sulfonic acid (hydrolyzed) | 1-aminobenzene-3-β-sulfatoethylsulfone | orange |
| 40 | 1-Aminobenzene-2-sulfonic acid → 2-amino-5-hydroxynaphthalene-1,7-disulfonic acid | 1-aminobenzene-3-β-sulfatoethylsulfone | orange |
| 41 | 2-Aminonaphthalene-1,5-disulfonic acid → 2-acetylamino-5-hydroxynaphthalene-7-sulfonic acid hydrolyzed | 1-aminobenzene-3-β-sulfatoethylsulfone | orange |
| 42 | 2-Aminonaphthalene-3,6,8-trisulfonic acid → 2-acetylamino-5-hydroxynaphthalene-7-sulfonic acid hydrolyzed | 1-aminobenzene-3-β-sulfatoethylsulfone | orange |
| 43 | 2-Aminonaphthalene-1,5,7-trisulfonic acid → 1-acetylamino-5-hydroxynaphthalene-7-sulfonic acid hydrolyzed | 1-aminobenzene-3-β-sulfatoethylsulfone | orange |
| 44 | 1-Amino-4-methoxybenzene-2,5-disulfonic acid → 2-amino-5-hydroxynaphthalene-7-sulfonic acid | 1-aminobenzene-3-β-sulfatoethylsulfone | scarlet |
| 45 | 1-Amino-4-methoxybenzene-2-sulfonic acid → 2-amino-5-hydroxynaphthalene-7-sulfonic acid | 1-aminobenzene-3-β-sulfatoethylsulfone | scarlet |
| 46 | 1-Aminobenzene-2-sulfonic acid → 1-(4'-nitrobenzoylamino)-8-hydroxynaphthalene-3,6-disulfonic acid (reduced) | 1-aminobenzene-3-β-sulfatoethylsulfone | red |

-continued

| | Starting amino compounds of the formula | | |
|---|---|---|---|
| Ex. | F—N(R$^x$)H | H$_2$N—Q$^1$ | Color shade |
| 47 | 1-Aminobenzene-2,5-disulfonic acid → 1-(3'-nitrobenzoylamino)-8-hydroxynaphthalene-4,6-disulfonic acid (reduced) | 1-aminobenzene-3-β-sulfatoethylsulfone | red |
| 48 | 2-Amino-5-aminomethylnaphthalene-1-sulfonic acid → 1-benzoylamino-8-hydroxynaphthalene-3,6-disulfonic acid | 1-aminobenzene-3-β-sulfatoethylsulfone | red |
| 49 | 1-Aminonaphthalene-1,5-disulfonic acid → 1-(4'-nitrobenzoylamino)-8-hydroxynaphthalene-3,6-disulfonic acid (reduced) | 1-aminobenzene-3-β-sulfatoethylsulfone | red |
| 50 | 1-Hydroxy-2-aminobenzene-4-sulfonic acid → 2-amino-5-hydroxynaphthalene-7-sulfonic acid (Cu complex) | 1-aminobenzene-3-β-sulfatoethylsulfone | ruby |
| 51 | 1-Hydroxy-2-aminobenzene-4,6-disulfonic acid → 2-amino-5-hydroxynaphthalene-7-sulfonic acid (Cu complex) | 1-aminobenzene-3-β-chloroethylsulfone | ruby |
| 52 | 1-Hydroxy-2-aminobenzene-4,6-disulfonic acid → 2-ethylamino-5-hydroxynaphthalene-7-sulfonic acid (Cu complex) | 1-amino-4-methoxy-benzene-3-β-sulfato-ethylsulfone | ruby |
| 53 | 1-Hydroxy-2-aminobenzene-4,6-disulfonic acid → 2-amino-8-hydroxynaphthalene-3,6-disulfonic acid (Cu complex) | 1-aminobenzene-3-β-sulfatoethylsulfone | ruby |
| 54 | 1-Hydroxy-2-aminobenzene-4,6-disulfonic acid → 1-amino-8-hydroxynaphthalene-3,6-disulfonic acid (Cu complex) | 1-aminobenzene-3-β-sulfatoethylsulfone | violet |
| 55 | 1-Hydroxy-2-amino-4,6-disulfonic acid → 1-amino-8-hydroxynaphthalene-4,6-disulfonic acid (Cu complex) | 1-aminobenzene-3-β-sulfatoethylsulfone | violet |
| 56 | 1-Hydroxy-2-amino-4-acetylaminobenzene-6-sulfonic acid → 1-amino-8-hydroxynaphthalene-2,4-disulfonic acid, (Cu complex) (hydrolyzed) | 1-aminobenzene-3-β-sulfatoethylsulfone | blue |
| 57 | 1-Hydroxy-2-amino-6-acetylaminobenzene-4-sulfonic acid → 1-amino-8-hydroxynaphthalene-2,4-disulfonic acid, hydrolyzed (Cu complex) | 1-aminobenzene-3-β-sulfatoethylsulfone | blue |
| 58 | 1-Amino-2-hydroxy-6-nitronaphthalene-4-sulfonic acid → 1-amino-8-hydroxynaphthalene-2,4-disulfonic acid reduced (Cu complex) | 1-aminobenzene-3-β-sulfatoethylsulfone | blue |
| 59 | 1-Amino-2-hydroxy-6-nitronaphthalene-4-sulfonic acid → 1-amino-8-hydroxynaphthalene-2,4,6-trisulfonic acid reduced (Cu complex) | 1-aminobenzene-3-β-sulfatoethylsulfone | blue |
| 60 | 2-Amino-1-hydroxynaphthalene-4,8-disulfonic acid → 1-amino-8-hydroxynaphthalene-3,6-disulfonic acid (Cu complex) | 1-aminobenzene-3-β-sulfatoethylsulfone | blue |
| 61 | 2-Aminonaphthalene-4,8-disulfonic acid → 2-hydroxy-3-aminonaphthalene-5,7-disulfonic acid (coppered with oxidation) | 1-aminobenzene-3-β -sulfatoethylsulfone | blue |
| 62 | 3-Methoxy-4-amino-6-methylazobenzene-2'5'-disulfonic acid → 2-methylamino-5-hydroxynaphthalene-7-sulfonic acid (coppered with demethylation) | 1-aminobenzene-3-β-sulfatoethylsulfone | navy blue |
| 63 | 3-Methoxy-4-amino-6-methylazobenzene-2'4'-disulfonic acid → 2-amino-5-hydroxynaphthalene-1,7-disulfonic acid (coppered with demethylation) | 1-aminobenzene-3-β-sulfatoethylsulfone | navy blue |
| 64 | 1-Amino-3-acetylaminobenzene-6-sulfonic acid → 1-amino-8-hydroxy-7-(4'-sulfophenylazo)-naphthalene-3,6-disulfonic acid (hydrolyzed) | 1-aminobenzene-3-β-sulfatoethylsulfone | blue |
| 65 | 1-Amino-4-(3'-amino-2',4',6'-trimethylphenylamino) anthraquinone-2,5'-disulfonic acid | 1-aminobenzene-3-β-sulfatoethylsulfone | blue |
| 66 | 1-Amino-4-(2',6'-dimethyl-3'-aminomethyl-phenylamino) anthraquinone-2,5'-disulfonic acid | 1-aminobenzene-3-β-sulfatoethylsulfone | reddish-tinged blue |
| 67 | 1-Amino-4-(4'-methyl-2'-aminomethyl-phenylamino) anthraquinone-2,6'-disulfonic acid | 1-aminobenzene-3-β-sulfatoethylsulfone | reddish-tinged blue |
| 68 | 1-Amino-4-(5'-amino-phenylamino)-anthraquinone-2,2',4'-trisulfonic acid | 1-aminobenzene-3-β-sulfatoethylsulfone | blue |
| 69 | 1-Amino-4-(4'-amino-phenylamino)-anthraquinone-2,3'-disulfonic acid | 1-aminobenzene-3-β-sulfatoethylsulfone | blue |
| 70 | 1-Amino-4-(4'-amino-phenylamino)-anthraquinone-2,2'-disulfonic acid | 1-aminobenzene-3-β-sulfatoethylsulfone | blue |
| 71 | 1-Amino-4-(3'-amino-phenylamino)-anthraquinone-2,4'-disulfonic acid | 1-aminobenzene-3-β-sulfatoethylsulfone | blue |
| 72 | 1-Amino-4-(2'-methyl-3'-amino-phenylamino)-anthraquinone-2,5'-disulfonic acid | 1-aminobenzene-3-β-sulfatoethylsulfone | blue |
| 73 | 1-Amino-4-(2'-methyl-3'-amino-phenylamino)-anthraquinone-2,6,5'-trisulfonic acid | 1-aminobenzene-3-β-sulfatoethylsulfone | greenish-tinged blue |
| 74 | 1-Amino-4-(5'-aminomethyl-phenylamino)-anthraquinone-2,2',4'-trisulfonic acid | 1-aminobenzene-3-β-sulfatoethylsulfone | blue |
| 75 | 1-Amino-4-(4'-amino-cyclohexylamino)-anthraquinone-2,6-disulfonic acid | 1-aminobenzene-3-β-sulfatoethylsulfone | blue |
| 76 | 1-Amino-4-(4'-amino-cyclohexylamino)-anthraquinone-2-sulfonic acid | 1-aminobenzene-5-β-sulfatoethylsulfone-2,4-disulfonic acid | blue |
| 77 | 1-Amino-4-(3'-amino-4'-methyl-cyclohexylamino)-anthraquinone-2-sulfonic acid | 1-aminobenzene-5-β-sulfatoethylsulfone- | blue |

-continued

| | Starting amino compounds of the formula | | |
|---|---|---|---|
| Ex. | F—N(R$^x$)H | H$_2$N—Q$^1$ | Color shade |
| 78 | 1-Amino-4-(3'-amino-2'-methyl-cyclohexylamino)-anthraquinone-2-sulfonic acid | 1-aminobenzene-5-β-sulfatoethylsulfone-2,4-disulfonic acid | blue |
| 79 | 1-Amino-4-(4'-amino-3'-methyl-cyclohexylamino)-anthraquinone-2-sulfonic acid | 1-aminobenzene-5-β-sulfatoethylsulfone-2,4-disulfonic acid | blue |
| 80 | 1-Amino-4-(4'-aminomethyl-cyclohexylamino)-anthraquinone-2-sulfonic acid | 1-aminobenzene-5-β-sulfatoethylsulfone-2,4-disulfonic acid | blue |
| 81 | 1-Amino-4-(3'-aminomethyl-cyclohexylamino)-anthraquinone-2-sulfonic acid | 1-aminobenzene-5-β-sulfatoethylsulfone-2,4-disulfonic acid | blue |
| 82 | 1-Amino-4-(2'-amino-ethylamino)-anthraquinone-2-sulfonic acid | 1-aminobenzene-5-β-sulfatoethylsulfone-2,4-disulfonic acid | blue |
| 83 | 1-Amino-4-(2'-methylamino-ethylamino)-anthraquinone-2-sulfonic acid | 1-aminobenzene-5-β-sulfatoethylsulfone-2-sulfonic acid | blue |
| 84 | 1-Amino-4-(3'-amino-1-propylamino)-anthraquinone-2-sulfonic acid | 1-aminobenzene-5-β-sulfatoethylsulfone-2-sulfonic acid | blue |
| 85 | 1-Amino-4-(3'-methylamino-1-propylamino)-anthraquinone-2-sulfonic acid | 1-aminobenzene-5-β-sulfatoethylsulfone-2-sulfonic acid | blue |
| 85 | 1-Amino-4-(4'-amino-1-butylamino)-anthraquinone-2-sulfonic acid | 1-aminobenzene-5-β-sulfatoethylsulfone-2-sulfonic acid | blue |
| 87 | N-(2-Carboxy-4-sulfophenyl)-N'-(2'-hydroxy-3'-amino-5'-sulfophenyl)-ms-phenylformazan (Cu complex) | 1-aminobenzene-3-β-sulfatoethylsulfone | blue |
| 88 | N-(2-Carboxy-5-sulfophenyl)-N'-(2'-hydroxy-3'-amino-5'-sulfophenyl)-ms-phenylformazan | 1-aminobenzene-3-β-sulfatoethylsulfone | blue |
| 89 | N-(2-Carboxy-4-sulfophenyl)-N'-(2'-hydroxy-3'-amino-5'-sulfophenyl)-ms-(2''-chloro-5''-sulfophenyl)-formazan (Cu complex) | 1-aminobenzene-3-β-sulfatoethylsulfone | blue |
| 90 | N-(2-Carboxy-4-aminophenyl)-N'-(2'-hydroxy-3'5'-disulfophenyl)-ms-(3''-sulfophenyl)-formazan (Cu complex) | 1-aminobenzene-3-β-sulfatoethylsulfone | blue |
| 91 | N-(2-Carboxy-5-sulfophenyl)-N'-(2'-hydroxy-3'5'-disulfophenyl)-ms-(3''-aminophenyl)-formazan (Cu complex) | 1-aminobenzene-3-β-sulfatoethylsulfone | greenish-tinged blue |
| 92 | N-(2-Hydroxy-3-amino-5-sulfophenyl)-N'-(2'-hydroxy-4'-sulfophenyl)-ms-(2''-sulfophenyl)-formazan (Cu complex) | 1-aminobenzene-3-β-sulfatoethylsulfone | navy blue |
| 93 | N-(2-Hydroxy-5-sulfophenyl)-N'-(2'-hydroxy-3',5'-disulfophenyl)-ms-(4''-aminophenyl)-formazan (Cu complex) | 1-aminobenzene-3-β-sulfatoethylsulfone | blue |
| 94 | N-(2-Hydroxy-5-amino-3-sulfophenyl)-N'-(2',5'-disulfophenyl)-ms-phenylformazan (Cu complex) | 1-aminobenzene-3-β-sulfatoethylsulfone | blue |
| 95 | N-(2-Hydroxy-4,6-disulfophenyl)-N'-(2',4'-disulfophenyl)-ms-(3''-aminophenyl)-formazan (Cu complex) | 1-aminobenzene-3-β-sulfatoethylsulfone | blue |
| 96 | N-(2-Hydroxy-4-sulfophenyl)-N'-(4'-amino-2'-sulfophenyl)-ms-(4''-chloro-3''-sulfophenyl)-formazan (Cu complex) | 1-aminobenzene-3-β-sulfatoethylsulfone | blue |
| 97 | [CuFe-(3)]—(SO$_3$H)$_2$, —SO$_2$NH$_2$, —SO$_2$NH—C$_6$H$_4$—NH$_2$ | 1-aminobenzene-3-β-sulfatoethylsulfone | turquoise blue |
| 98 | [NiFe-(3)]—(SO$_3$H)$_2$, —SO$_2$NH$_2$, —SO$_2$NH—C$_6$H$_4$—NH$_2$ | 1-aminobenzene-3-β-sulfatoethylsulfone | turquoise blue |
| 99 | [CuFe-(3)]—(SO$_3$H)$_2$, —SO$_2$NH$_2$, —SO$_2$NH—C$_6$H$_4$—NH$_2$ | 1-aminobenzene-3-β-sulfatoethylsulfone | turquoise blue |

-continued

Starting amino compounds of the formula

| Ex. | F—N(R*)H | H₂N—Q¹ | Color shade |
|---|---|---|---|
| 100 | [CuFe-(3)] with (SO₃H)$_{2.7}$ and [SO₂NH—C₆H₄—NH₂]$_{1.3}$ | 1-aminobenzene-3-β-sulfatoethylsulfone | turquoise blue |
| 101 | [CuFe-(3)]—[SO₃H, SO₂NH₂]$_{2.6}$ and [SO₂NH—C₆H₃(NH₂)—SO₃H]$_{1.3}$ | 1-aminobenzene-3-β-sulfatoethylsulfone | turquoise blue |
| 102 | [CuFe-(4)]—[SO₃H, SO₂NH₂]$_{2.6}$ and [SO₂NH—C₆H₃(NH₂)—SO₃H]$_{1.4}$ | 1-aminobenzene-3-β-sulfatoethylsulfone | turquoise blue |
| 103 | [CuFe-(4)] with (SO₃H)$_2$, SO₂NH₂, SO₂NH—C₆H₄—NH₂ | 1-aminobenzene-3-β-sulfatoethylsulfone | turquoise blue |
| 104 | [NiFe-(4)] with (SO₃H)$_2$, SO₂NH—C₆H₄—NH₂ | 1-aminobenzene-3-β-sulfatoethylsulfone | turquoise blue |
| 105 | [CuFe-(3)] with (SO₃H)$_{2.5}$ and (SO₂NHCH₂CH₂NH₂)$_{1.5}$ | 1-aminobenzene-3-β-sulfatoethylsulfone | turquoise blue |
| 106 | [CuFe-(3)] with (SO₃H)$_2$, SO₂NH₂, SO₂NHCH₂CH₂NH₂ | 1-aminobenzene-3-β-sulfatoethylsulfone | turquoise blue |
| 107 | 2-Aminonaphthalene-1,5-disulfonic acid → 1-amino-3-methylbenzene | 1-aminobenzene-4-β-sulfatoethylsulfone | yellow |
| 108 | 2-Aminonaphthalene-1,5-disulfonic acid → 1-amino-3-methyl-6-methoxybenzene | 1-aminobenzene-4-β-sulfatoethylsulfone | reddish-tinged yellow |
| 109 | 2-Aminonaphthalene-5,7-disulfonic acid → 1-amino-3-methylbenzene | 1-aminobenzene-4-β-sulfatoethylsulfone | reddish-tinged yellow |
| 110 | 2-Aminonaphthalene-4,8-disulfonic acid → N-methylaminobenzene | 1-aminobenzene-4-β-sulfatoethylsulfone | yellow |
| 111 | 2-Aminonaphthalene-4,8-disulfonic acid → 1-N-ethylamino-3-methylbenzene | 1-aminobenzene-4-β-sulfatoethylsulfone | yellow |
| 112 | 2-Aminonaphthalene-3,6,8-trisulfonic acid → 1-aminobenzene | 1-aminobenzene-4-β-sulfatoethylsulfone | reddish-tinged yellow |
| 113 | 1-Aminonaphthalene-2,5,7-trisulfonic acid → 1-amino-3-methyl-6-methoxybenzene → 1-aminonapthalene-8-sulfonic acid | 1-aminobenzene-4-β-sulfatoethylsulfone | reddish-tinged brown |
| 114 | 1-Amino-3-acetylaninobenzene-6-sulfonic acid → 1-ethyl-3-sulfomethyl-4-methyl-6-hydroxy-2-pyridone-5-carboxamide (hydrolyzed) | 1-amino-2-methoxy benzene-4-β-sulfato-ethylsulfone | yellow |
| 115 | 1-Amino-3-acetylaminobenzene-6-sulfonic acid → 1-ethyl-3-aminocarbonyl-4-methyl-6-hydroxy- | 1-amino-benzene-4-β-sulfatoethylsulfone | yellow |

| Ex. | Starting amino compounds of the formula F—N(R$^x$)H | H$_2$N—Q$^1$ | Color shade |
|---|---|---|---|
| 116 | 1-Amino-3-acetylaminobenzene-6-sulfonic acid → 1-(4'-sulfophenyl)-3-methyl-5-pyrazolone (hydrolyzed) | 1-amino-benzene-4-β-sulfatoethylsulfone | yellow |
| 117 | 1-Amino-3-acetylaminobenzene-6-sulfonic acid → 1-(5',7'-disulfo-2'-naphthyl)-3-methyl-5-pyrazolone (hydrolyzed) | 1-amino-benzene-4-β-sulfatoethylsulfone | yellow |
| 118 | 1-Aminobenzene-2,4-disulfonic acid → 2-acetylamino-5-hydroxynaphthalene-7-sulfonic acid (hydrolyzed) | 1-amino-2-methoxy benzene-5-β-sulfato-ethylsulfone | orange |
| 119 | 1-Aminonaphthalene-1,5-disulfonic acid → 2-acetylamino-5-hydroxynaphthalene-7-sulfonic acid (hydrolyzed) | 1-amino-2-methoxy benzene-5-β-sulfo-ethylsulfone | orange |
| 120 | 1-Amino-methoxybenzene-2-sulfonic acid → 2-amino-5-hydroxynaphthalene-6-sulfonic acid | 1-aminobenzene-3-β-sulfatoethylsulfone | scarlet |
| 121 | 1-Aminonaphthalene-1,5-disulfonic acid → 2-acetylamino-8-hydroxynaphthalene-6-sulfonic acid (hydrolyzed) | 1-aminobenzene-4-β-sulfatoethylsulfone | yellowish-tinged red |
| 122 | 1-Aminobenzene-2,4-disulfonic acid → 1-(4'-nitrobenzoylamino)-8-hydroxynapthalene-3,6-disulfonic acid (reduced) | 1-aminobenzene-4-β-sulfatoethylsulfone | red |
| 123 | 2-Aminonaphthalene-1,5-disulfonic acid → 1-(4'-nitrobenzoylamino)-8-hydroxynaphthalene-4,6-disulfonic acid (reduced) | 1-aminobenzene-3-β-sulfatoethylsulfone | red |
| 124 | 1-Hydroxy-2-aminobenzene-4,6-disulfonic acid → 2-amino-8-hydroxynaphthalene-6-sulfonic acid (Cu complex) | 1-aminobenzene-3-β-sulfatoethylsulfone | ruby |
| 125 | 1-Hydroxy-2-aminobenzene-5-sulfonic acid → 1-amino-8-hydroxynaphthalene-3,6-disulfonic acid (Cu complex) | 1-aminobenzene-4-β-sulfatoethylsulfone | violet |
| 126 | 1-Amino-2-hydroxy-6-nitronaphthalene-4-sulfonic acid → 1-amino-8-hydroxynaphthalene-2,4-disulfonic acid (Cu complex) | 1-aminobenzene-3-β-sulfatoethylsulfone | blue |
| 127 | 1-Hydroxy-2-amino-4-acetylaminobenzene-6-sulfonic acid →1-amino-8-hydroxynapththalene-2,4,6-trisulfonic acid (hydrolyzed, Cu complex) | 1-aminonaphthalene-4-β-sulfatoethylsulfone | navy blue |
| 128 | 2-Amino-1-methylbenzene-3,5-disulfonic acid → 1-amino-2-methoxy-5-methylbenzene → 2-amino-5-hydroxynaphthalene-7-sulfonic acid (coppered with demethylation) | 1-aminobenzene-3-β-sulfatoethylsulfone | navy blue |
| 129 | 1-Amino-3-acetylaminobenzene-6-sulfonic acid → 1-amino-8-hydroxy-2-(phenylazo)-naphthalene-3,6-disulfonic acid (hydrolyzed) | 1-aminobenzene-3-β-sulfatoethylsulfone | blue |
| 130 | 1-Amino-3-acetylaminobenzene-6-sulfonic acid → 1-amino-8-hydroxy-7-(2',5'-disulfophenylazo)-naphthalene-3,6-disulfonic acid | 1-amino-2,5-di-methoxybenzene-4-β-sulfatoethylsulfone | blue |

Example 131

14.5 parts of 1-amino-8-hydroxynaphthalene-3,6-disulfonic acid are added to the 2,4,6-trichloro-pyrimidine-5-carboxylic acidN-[γ-(β'-sulfatoethylsulfonyl)-propyl]-amide solution prepared under Example A and the reaction is carried out for three hours while maintaining a pH of about 4.5 and a temperature of about 80° C. The mixture is then cooled to 0° to 10° C. and a sulfuric acid aqueous diazonium salt solution prepared in the customary manner from 11.3 parts of 2-aminonaphthalene-1,5-disulfonic acid is added, the coupling reaction is carried out within this temperature range and at a pH of about 6.5 and the resulting azo compound according to the invention, which has the formula, written in the form of the free acid,

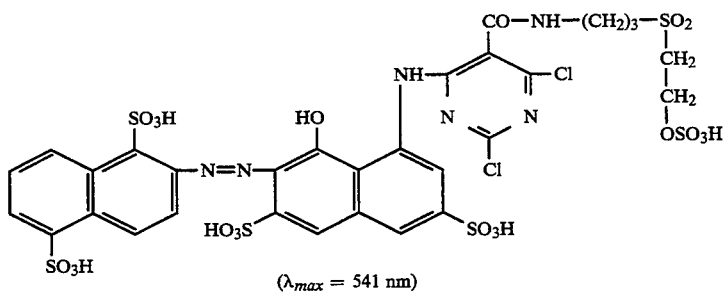

($\lambda_{max}$ = 541 nm)

is isolated in the customary manner by salting out with sodium chloride. The azo compound has very good dyestuff properties and dyes the materials mentioned in the description, in particular cellulose fiber materials, such as cotton, in brilliant bluish-tinged red shades with good fastness properties by the application and fixing processes customary in the art for fiber-reactive dyestuffs.

Examples 132 to 166

Further azo dyestuffs according to the invention corresponding to the formula B

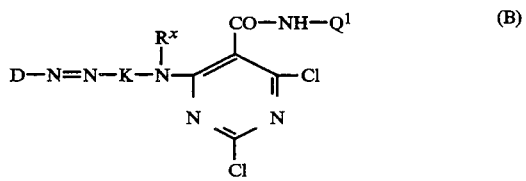

are described in the following tabular examples with the aid of their components (the diazo radical D, the radical —K—N($R^x$)— of a coupling component containing amino groups and the radical $Q^1$). They can be prepared in the manner according to the invention, for example analogously to the abovementioned Example 131, using 2,4,6-trichloropyrimidine-5-carbonyl chloride and the diazo component D—$NH_2$ which can be seen from the particular Tabular Example, the coupling component H—K—NHR$^x$ and the amine $H_2N$—$Q^1$ (corresponding to the formula (23)). These novel dyestuffs have very good fiber-reactive dyestuff properties and dye the materials mentioned in the description, in particular cellulose fiber materials, such as cotton, in the color shade stated in the particular Tabular Example (for cotton here) in a good depth of color and with good fastnesses.

| | | Dyestuff of the formula (B) | | |
|---|---|---|---|---|
| Ex. | Radical D— | Radical —K—N($R^x$)— | Radical —$Q^1$ | Color shade |
| 132 | 2-Sulfo-phenyl | 3,6-disulfo-8-hydroxy-naphth-7-yl-1-amino | 3-(β-sulfatoethyl-sulfonyl)-phenyl | red |
| 133 | " | 4,6-disulfo-8-hydroxy-naphth-7-yl-1-amino | 3-(β-phosphatoethyl-sulfonyl)-phenyl | red |
| 134 | 4-Carboxy-2-sulfo-phenyl | 3,6-disulfo-8-hydroxy-naphth-7-yl-1-amino | 8-(β-sulfatoethyl-sulfonyl)-naphth-2-yl | red |
| 135 | 2-Sulfo-4-methyl-phenyl | 3,6-disulfo-8-hydroxy-naphth-7-yl-1-amino | 4-(β-sulfatoethyl-sulfonyl)-phenyl | red |
| 136 | 2,5-Disulfo-phenyl | 3,6-disulfo-8-hydroxy-naphth-7-yl-1-amino | 3-(β-sulfatoethyl-sulfonyl)-phenyl | red |
| 137 | 1-Sulfo-naphth-2-yl | 3,6-disulfo-8-hydroxy-naphth-7-yl-1-amino | 6-sulfo-8-(β-sulfato ethylsulfonyl)-naphth-2-yl | red |
| 138 | 1,5-Disulfo-naphth-2-yl | 4,6-disulfo-8-hydroxy-naphth-7-yl-1-amino | 3-(β-sulfatoethyl-sulfonyl)-phenyl | red |
| 139 | 1,5,7-Trisulfo-naphth-2-yl | 6-sulfo-8-hydroxy-naphth-7-yl-1-amino | 3-(β-sulfatoethyl-sulfonyl)-phenyl | red |
| 140 | 1,5-Disulfo-naphth-2-yl | 3-acetylamino-phen-4-yl-1-amino | 3-(β-sulfatoethyl-sulfonyl)-phenyl | reddish-tinged yellow |
| 141 | " | 3-ureido-phen-4-yl-1-amino | 3-(β-sulfatoethyl-sulfonyl)-phenyl | reddish-tinged yellow |
| 142 | 5,7-Disulfo-naphth-2-yl | 3-acetylamino-phen-4-yl-1-amino | 3-(β-sulfatoethyl-sulfonyl)-phenyl | reddish-tinged yellow |
| 143 | " | 3-ureido-phen-4-yl-1-amino | 4-(β-sulfatoethyl-sulfonyl)-phenyl | reddish-tinged yellow |
| 144 | 4,8-Disulfo-naphth-2-yl | 3-methyl-phen-4-yl-1-amino | 3-(β-sulfatoethyl-sulfonyl)-phenyl | yellow |
| 145 | " | 3-acetylamino-phen-4-yl-1-amino | 3-(β-sulfatoethyl-sulfonyl)-phenyl | yellow |
| 146 | 3,6-Disulfo-naphth-2-yl | 3-acetylamino-phen-4-yl-1-amino | 3-(β -sulfatoethyl-sulfonyl)-phenyl | reddish-tinged yellow |
| 147 | 6,8-Disulfo-naphth-2-yl | 3-acetylamino-phen-4-yl-1-amino | 3-(β-sulfatoethyl-sulfonyl)-phenyl | reddish-tinged yellow |
| 148 | 3,6,8-Trisulfo-naphth-2-yl | 3-acetylamino-phen-4-yl-1-amino | 3-(β-sulfatoethyl-sulfonyl)-phenyl | reddish-tinged yellow |
| 149 | 3,6-Disulfo-naphth-2-yl | 3-ureido-phen-4-yl-1-amino | 3-(β-sulfatoethyl-sulfonyl)-phenyl | reddish-tinged yellow |
| 150 | 3,6,8-Trisulfo-naphth-2-yl | 3-ureido-phen-4-yl-1-amino | 3-(β-sulfatoethyl-sulfonyl)-phenyl | reddish-tinged yellow |
| 151 | 3,6,8-Trisulfo-naphth-2-yl | 3-methyl-phen-4-yl-1-amino | 3-(β-sulfatoethyl-sulfonyl)-phenyl | reddish-tinged yellow |
| 152 | 4,6,8-Trisulfo-naphth-2-yl | 3-ureido-phen-4-yl-1-amino | 3-(β-sulfatoethyl-sulfonyl)-phenyl | reddish-tinged yellow |
| 153 | 2,5-Disulfo-phenyl | 6-sulfo-naphth-4-yl-1-amino | 3-(β-sulfatoethyl-sulfonyl)-phenyl | reddish-tinged yellow |
| 154 | 4-(2',5'-Disulfo-phenyl)-azo-6-sulfo-naphth-1-yl | 8-sulfo-naphth-4-yl-amino | 3-(β-sulfatoethyl-sulfonyl)-phenyl | reddish-tinged brown |
| 155 | 4-(2',5',7'-Trisulfo-naphth-1'-yl)-azo-6-sulfo-naphth-1-yl | 8-sulfo-naphth-4-yl-amino | 3-(β-sulfatoethyl-sulfonyl)-phenyl | violet-tinged brown |
| 156 | 4-(2'-5'-7'-Trisulfo-naphth-1'-yl)-azo-2,5-di-methylphenyl | 6-sulfo-naphth-4-yl-1-amino | 3-(β-sulfatoethyl-sulfonyl)-phenyl | reddish-tinged brown |
| 157 | 2,5-Disulfo-phenyl | 1-phenyl-3-methyl-pyrazol-5-on-4-yl-3'-amino | 4-(β-sulfatoethyl-sulfonyl)-phenyl | yellow |
| 158 | " | 6-sulfo-8-hydroxy-naphth-7-yl-3-amino | 3-(β-sulfatoethyl-sulfonyl)-phenyl | orange |
| 159 | 2-Sulfo-phenyl | 4,6-disulfo-8-hydroxy-naphth-7-yl-3-amino | 3-(β-sulfatoethyl-sulfonyl)-phenyl | orange |
| 160 | 1,5-Disulfo-naphth-2-yl | 6-sulfo-8-hydroxy-naphth-7-yl-3-amino | 3-(β-sulfatoethyl-sulfonyl)-phenyl | orange |

-continued

| Ex. | Radical D— | Dyestuff of the formula (B) Radical —K—N(R$^x$)— | Radical —Q$^1$ | Color shade |
|---|---|---|---|---|
| 161 | 3,6,8-Trisulfo-naphth-2-yl | 6-sulfo-8-hydroxy-naphth-7-yl-3-amino | 3-($\beta$-sulfatoethyl-sulfonyl)-phenyl | orange |
| 162 | 2,5-Disulfo-4-methoxy-phenyl | 6-sulfo-8-hydroxy-naphth-7-yl-3-amino | 3-($\beta$-sulfatoethyl-sulfonyl)-phenyl | scarlet |
| 163 | 2-Sulfo-4-methoxy-phenyl | 6-sulfo-8-hydroxy-naphth-7-yl-3-amino | 3-($\beta$-sulfatoethyl-sulfonyl)-phenyl | scarlet |
| 164 | 2,5-Disulfo-phenyl | 4,6-disulfo-8-hydroxy-1-(benzoylamino)-naphth-7-yl-3'-amino | 3-($\beta$-sulfatoethyl-sulfonyl)-phenyl | red |
| 165 | 1,5-Disulfo-naphth-2-yl | 3,6-disulfo-8-hydroxy-1-(benzoylamino)-naphth-7-yl-4'-amino | 3-($\beta$-sulfatoethyl-sulfonyl)-phenyl | red |
| 166 | 2-Sulfo-phenyl | 3,6-disulfo-8-hydroxy-1-(benzoylamino)-naphth-7-yl-4'-amino | 3-($\beta$-sulfatoethyl-sulfonyl)-phenyl | red |

Example 167

12.7 parts of 1,4-diaminobenzene-2,5-disulfonic acid are added to the 2,4,6-trichloro-pyrimidine-5-carboxylic acid N-[$\gamma$-($\beta'$-sulfatoethylsulfonyl)-propyl]-amide solution prepared in accordance with the information in Example A and the reaction is carried out at a temperature of between 60° and 80° C. for three hours, while maintaining a pH of between 4 and 5 by means of 15% strength aqueous sodium carbonate solution. The mixture is then cooled to 20° C., 7 parts of solid sodium nitrite are added and the mixture is subsequently stirred into a mixture of 25 parts by volume of an aqueous 10N hydrochloric acid and 100 parts of ice. The diazonium salt solution thus obtained is then stirred into a neutral solution of 1-ethyl-3-sulfomethyl-4-methyl-6-hydroxy-2-pyridone-5-carboxamide in 100 parts of water, the pH is brought to 6.5 and the coupling reaction is carried out at about 10° C., while maintaining this pH.

The resulting azo compound according to the invention, of the formula (written in the form of the free acid)

Example 168

80 parts by volume of an aqueous solution containing 9.4 parts of the sodium salt of 1,3-diaminobenzene-4-sulfonic acid are added to the 2,4,6-trichloro-pyrimidine-5-carboxylic acid N-[$\gamma$-($\beta'$-sulfatoethylsulfonyl)-propyl]-amide solution prepared in accordance with the information in Example A. The reaction is carried out at a temperature of 60° C. and at a pH of 5. When the reaction has ended, the mixture is cooled to 20° C. and the second amino group is diazotized in the customary manner, after addition of an aqueous concentrated hydrochloric acid, by means of an aqueous concentrated sodium nitrite solution. 16 parts of 1-acetylamino-8-hydroxy-naphthalene-3,6-disulfonic acid are added to the diazonium salt solution thus prepared and the coupling reaction is carried out at a pH of between 6 and 6.5 and at a temperature of about 20° C. The azo dyestuff according to the invention thus prepared, of the formula (written in the form of the free acid)

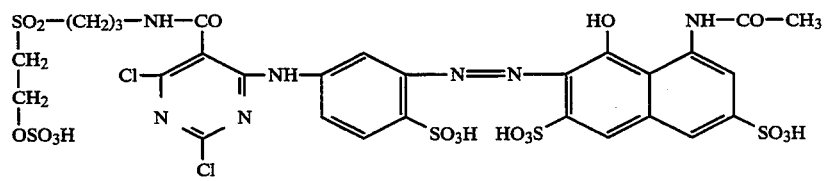

is isolated as the alkali metal salt (mainly the potassium salt) by salting out with potassium chloride.

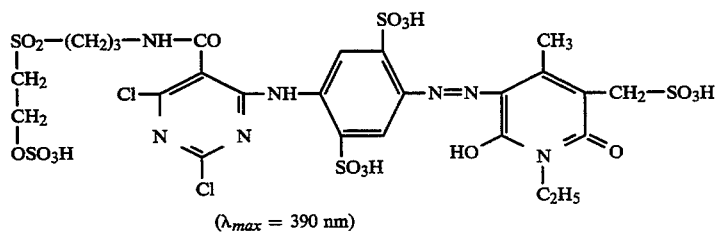

($\lambda_{max}$ = 390 nm)

is isolated by salting out with sodium chloride. An orange powder, containing electrolyte salt (mainly containing sodium chloride), of the alkali metal salt (mainly the sodium salt) of this monoazo compound according to the invention, which displays very good fiber-reactive dyestuff properties and, for example, dyes cotton in deep, yellow shades from an aqueous liquor, is obtained.

The dyestuff according to the invention dyes the materials mentioned in the description, in particular cellulose fiber materials, such as cotton, in deep brilliant, red shades with good fastness properties by the application and fixing methods customary in the art for fiber-reactive dyestuffs.

Examples 169 to 220

Further dyestuffs according to the invention corresponding to a formula (C)

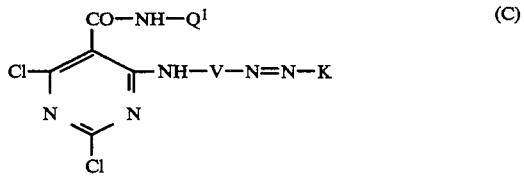

are described in the following Tabular Examples with the aid of their components (the phenylene radical V, the radical K of a coupling component and the radical $Q^1$). They can be prepared in the manner according to the invention, for example analogously to the above Examples 167 and 168, using 2,4,6-trichloro-pyrimidine-5-carbonyl chloride and the diamino-benzene compound $H_2N$—V—$NH_2$ which can be seen from the particular Tabular Example, the coupling component H—K and the amine $H_2N$—$Q^1$ corresponding to the formula (23). These novel dyestuffs have very good fiber-reactive dyestuff properties and dye the materials mentioned in the description, in particular cellulose fiber materials, such as cotton, in the color shade stated in the particular Tabular Example (for cotton here) in a good depth of color and with good fastnesses.

| Ex. | Radical —V— | Dyestuff of the formula (C) Radical —K | Radical —$Q^1$ | Color shade |
|---|---|---|---|---|
| 169 | 2,5-Disulfo-1,4-phenylene | 1-(4'-sulfophenyl)-3-methyl-pyrazol-5-on-4-yl | 3-($\beta$-sulfatoethyl-phenyl | yellow |
| 170 | 4,6-Disulfo-1,3-phenylene | 1-(2',5'-dichloro-4'-sulfophenyl)-3-methyl-pyrazol-5-on-4-yl | 3-($\beta$-sulfatoethyl-phenyl | yellow |
| 171 | 2,5-Disulfo-1,4-phenylene | 1-(2',5'-dichloro-4'-sulfophenyl)-3-methyl pyrazol-5-on-4-yl | 3-($\beta$-sulfatoethyl-phenyl | yellow |
| 172 | 4,6-Disulfo-1,3-phenylene | 1-(2',5'-dichloro-4'-sulfophenyl)-3-methyl pyrazol-5-on-4-yl | 3-($\beta$-phosphatoethyl-sulfonyl)-phenyl | yellow |
| 173 | 2,5-Disulfo-1,4-phenylene | 1-(2',5'-dichloro-4'-sulfophenyl)-3-methyl pyrazol-5-on-4-yl | 3-($\beta$-phosphatoethyl-sulfonyl)-phenyl | yellow |
| 174 | 4,6-Disulfo-1,3-phenylene | 1-(4',8'-disulfo-napthth-2'-yl)-3-methyl-pyrazol-5-on-4-yl | 3-($\beta$-sulfatoethyl-sulfonyl)-phenyl | reddish-tinged yellow |
| 175 | 4,5-Disulfo-1,4-phenylene | 1-(4',8'-disulfo-napthth-2'-yl)-3-methyl-pyrazol-5-on-4-yl | 3-($\beta$-sulfatoethyl-sulfonyl)-phenyl | reddish-tinged yellow |
| 176 | 4,6-Disulfo-1,3-phenylene | 1-ethyl-3-aminocarbonyl-4-methyl-6-hydroxy-pyrid-2-on-5-yl | 3-($\beta$-sulfatoethyl-sulfonyl)-phenyl | reddish-tinged yellow |
| 177 | 2,5-Disulfo-1,4-phenylene | 1-ethyl-3-aminocarbonyl-4-methyl-6-hydroxy-pyrid-2-on-5-yl | 3-($\beta$-sulfatoethyl-sulfonyl)-phenyl | reddish-tinged yellow |
| 178 | 4,6-Disulfo-1,3-phenylene | 1-[N-(3'5'-disulfo-4'-aminophenyl)-carbamoyl]-1-propen-2-yl | 3-($\beta$-sulfatoethyl-sulfonyl)-phenyl | yellow |
| 179 | 2,5-Disulfo-1,4-phenylene | 1-[N-(3'5'-disulfo-4'-aminophenyl)-carbamoyl]-1-propen-2-yl | 3-($\beta$-sulfatoethyl-sulfonyl)-phenyl | yellow |
| 180 | 4,6-Disulfo-1,3-phenylene | 4-sulfo-1-hydroxy-naphth-2-yl | 3-($\beta$-chloroethyl sulfonyl)-phenyl | bluish-tinged red |
| 181 | 2,5-Disulfo-1,4-phenylene | 4-sulfo-1-hydroxy-naphth-2-yl | 3-($\beta$-chloroethyl sulfonyl)-phenyl | bluish-tinged red |
| 182 | 4,6-Disulfo-1,3-phenylene | 4,6-disulfo-1-hydroxy-naphth-2-yl | 3-($\beta$-chloroethyl sulfonyl)-phenyl | red |
| 183 | 2,5-Disulfo-1,4-phenylene | 4,6-disulfo-1-hydroxy-naphth-2-yl | 3-($\beta$-chloroethyl sulfonyl)-phenyl | red |
| 184 | 4,6-Disulfo-1,3-phenylene | 6-sulfo-2-hydroxy-naphth-1-yl | 3-($\beta$-sulfatoethyl sulfonyl)-phenyl | red |
| 185 | 2,5-Disulfo-1,4-phenylene | 6-sulfo-2-hydroxy-naphth-1-yl | 3-($\beta$-sulfatoethyl sulfonyl)-phenyl | red |
| 186 | 4,5-Disulfo-1,3-phenylene | 3,6-disulfo-2-hydroxy-naphth-1-yl | 3-($\beta$-sulfatoethyl sulfonyl)-phenyl | red |
| 187 | 2,5-Disulfo-1,4-phenylene | 3,6-disulfo-2-hydroxy-naphth-1-yl | 3-($\beta$-sulfatoethyl sulfonyl)-phenyl | red |
| 188 | 4,5-Disulfo-1,3-phenylene | 6-sulfo-8-hydroxy-3-acetylamino-naphth-7-yl | 3-($\beta$-sulfatoethyl sulfonyl)-phenyl | scarlet |
| 189 | 2,5-Disulfo-1,4-phenylene | 6-sulfo-8-hydroxy-3-acetylamino-naphth-7-yl | 3-($\beta$-sulfatoethyl sulfonyl)-phenyl | scarlet |
| 190 | 4,5-Disulfo-1,3-phenylene | 6-sulfo-8-hydroxy-2-acetylamino-naphth-7-yl | 3-($\beta$-sulfatoethyl sulfonyl)-phenyl | red |
| 191 | 2,5-Disulfo-1,4-phenylene | 6-sulfo-8-hydroxy-2-acetylamino-naphth-7-yl | 3-($\beta$-sulfatoethyl sulfonyl)-phenyl | red |
| 192 | 4,5-Disulfo-1,3-phenylene | 3,6-disulfo-8-hydroxy-1-acetylamino-naphth-7-yl | 3-($\beta$-sulfatoethyl sulfonyl)-phenyl | bluish-tinged red |
| 193 | 2,5-Disulfo-1,4-phenylene | 3,6-disulfo-8-hydroxy-1-acetylamino-naphth-7-yl | 3-($\beta$-sulfatoethyl sulfonyl)-phenyl | bluish-tinged red |
| 194 | 4,5-Disulfo-1,3-phenylene | 3,6-disulfo-8-hydroxy-1- | 3-($\beta$-sulfatoethyl | red |

-continued

Dyestuff of the formula (C)

| Ex. | Radical —V— | Radical —K | Radical —Q¹ | Color shade |
|---|---|---|---|---|
| | | benzoylamino-naphth-7-yl | sulfonyl)-phenyl | |
| 195 | 2,4-Disulfo-1,4-phenylene | 3,6-disulfo-8-hydroxy-1-benzoylamino-naphth-7-yl | 3-(β-sulfatoethyl sulfonyl)-phenyl | red |
| 196 | 4,5-Disulfo-1,3-phenylene | 4,6-disulfo-8-hydroxy-1-benzoylamino-naphth-7-yl | 4-(β-sulfatoethyl-sulfonyl)-naphth-1-yl | red |
| 197 | 2,4-Disulfo-1,4-phenylene | 4,6-disulfo-8-hydroxy-1-benzoylamino-naphth-7-yl | 4-(β-sulfatoethyl-sulfonyl)-naphth-1-yl | red |
| 198 | 4,5-Disulfo-1,3-phenylene | 6-sulfo-8-hydroxy-2-acetylamino-naphth-7-yl | 3-(β-sulfatoethyl-sulfonyl)-phenyl | red |
| 199 | 2,4-Disulfo-1,4-phenylene | 6-sulfo-8-hydroxy-2-acetylamino-naphth-7-yl | 3-(β-sulfatoethyl-sulfonyl)-phenyl | red |
| 200 | 4,5-Disulfo-1,3-phenylene | copper complex of 1-(4',6',8'-trisulfo-1'-hydroxy-naphth-2'-yl)-azo 7-sulfo-2,5-dihydroxy-naphth-6-yl | 3-(β-sulfatoethyl-sulfonyl)-phenyl | reddish-tinged blue |
| 201 | 2,4-Disulfo-1,4-phenylene | copper complex of 1-(4',6',8'-trisulfo-1'-hydroxy-naphth-2'-yl)-azo 7-sulfo-2,5-dihydroxy-naphth-6-yl | 3-(β-sulfatoethyl-sulfonyl)-phenyl | reddish-tinged blue |
| 202 | 4,5-Disulfo-1,3-phenylene | 2-(4'-sulfophenyl)-azo-3,6-disulfo-1-amino-8-hydroxy-naphth-7-yl | 3-(β-sulfatoethyl-sulfonyl)-phenyl | blue |
| 203 | 2,4-Disulfo-1,4-phenylene | 2-(4'-sulfophenyl)-azo-3,6-disulfo-1-amino-8-hydroxy-naphth-7-yl | 3-(β-sulfatoethyl-sulfonyl)-phenyl | blue |
| 204 | 4,5-Disulfo-1,3-phenylene | 4,6-disulfo-1-hydroxy-naphth-2-yl | 3-(β-sulfatoethyl-sulfonyl)-phenyl | red |
| 205 | 2,4-Disulfo-1,4-phenylene | 4,6-disulfo-1-hydroxy-naphth-2-yl | 3-(β-sulfatoethyl-sulfonyl)-phenyl | red |
| 206 | 4,6-Disulfo-1,3-phenylene | 1-(4'-sulfophenyl)-3-methyl-pyrazol-5-on-4-yl | 3-(β-sulfatoethyl-sulfonyl)-phenyl | yellow |
| 207 | 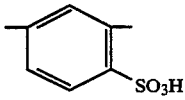 | 1-(3'-sulfophenyl)-3-methyl-pyrazol-5-on-4-yl | 4-(β-sulfatoethyl-sulfonyl)-phenyl | yellow |
| 208 | " | 1-(3'-sulfophenyl)-3-methyl-5-amino-pyrazol-4-yl | 4-(β-sulfatoethyl-sulfonyl)-phenyl | yellow |
| 209 | " | 1-(2',5'-dichloro-4'-sulfo-phenyl)-3-methyl-pyrazol-5-on-4-yl | 4-(β-sulfatoethyl-sulfonyl)-phenyl | yellow |
| 210 | " | 1-(5',7'-disulfo-naphth-2'-yl)-3-methyl-pyrazol-5-on-4-yl | 4-(β-sulfatoethyl-sulfonyl)-phenyl | yellow |
| 211 | " | 1-ethyl-3-sulfomethyl-4-methyl-6-hydroxy-2-on-5-yl | 4-(β-sulfatoethyl-sulfonyl)-phenyl | yellow |
| 212 | " | 6-sulfo-2-amino-naphth-1-yl | 4-(β-sulfatoethyl-sulfonyl)-phenyl | orange |
| 213 | " | 5,7-disulfo-2-amino-naphth-1-yl | 3-(β-sulfatoethyl sulfonyl)-phenyl | orange |
| 214 | " | 6-sulfo-8-hydroxy-2-(methylamino)-naphth-1-yl | 3-(β-sulfatoethyl sulfonyl)-phenyl | orange |
| 215 | " | 3,6-disulfo-2-hydroxy-naphth-1-yl | 3-(β-sulfatoethyl sulfonyl)-phenyl | scarlet |
| 216 | " | 6-sulfo-8-hydroxy-3-acetylamino-naphth-7-yl | 3-(β-sulfatoethyl sulfonyl)-phenyl | orange |
| 217 | " | 3,6-disulfo-8-hydroxy-1-benzoylamino-naphth-7-yl | 3-(β-sulfatoethyl sulfonyl)-phenyl | red |
| 218 | " | 4,6-disulfo-8-hydroxy-1-acetylamino-naphth-7-yl | 3-(β-sulfatoethyl sulfonyl)-phenyl | red |
| 219 | 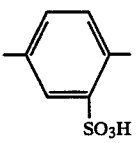 | 1-(2'-4'-sulfophenyl)-3-carboxy-pyrazol-5-on-4-yl | 3-(β-sulfatoethyl sulfonyl)-phenyl | yellow |

| Ex. | Radical —V— | Dyestuff of the formula (C) Radical —K | Radical —Q¹ | Color shade |
|---|---|---|---|---|
| 220 | 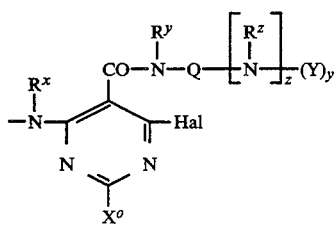 | 1-(2'-chloro-5'-sulfo phenyl)-3-methyl-pyrazol-5-on-4-yl | 3-(β-sulfatoethyl-sulfonyl)-phenyl | yellow |

We claim:

1. A dyestuff corresponding to the formula F—Z, in which

F is the radical of a mono-, dis- or polyazo dye-stuff containing sulfo groups or of a heavy metal complex mono-, dis- or trisazo dyestuff, or of an anthraquinone, phthalocyanine, formazan, azomethine, nitroaryl, dioxazine, phenazine or stilbene dyestuff and Z is a group of the formula (2)

$$R^x-N-C(R^y)=C(CO-N(R^z)-Q-[N-]_z(Y)_y)-Hal \text{ ... triazine with } X^o \tag{2}$$

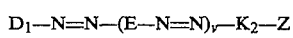

in which

R$^x$ is hydrogen or alkyl having 1 to 4 carbon atoms, and in which —N(R$^x$)— is optionally part of a saturated heterocyclic radical, R$^y$ is hydrogen or alkyl having 1 to 4 carbon atoms, R$^z$ is hydrogen, Q is phenylene, which can be substituted by 1 or 2 of the following substituents; alkyl having 1 to 4 carbon atoms, alkoxy having 1 to 4 carbon atoms, halogen, nitro, hydroxy, carboxy or sulfo, or is naphthylene, which can be substituted by 1, 2 or 3 sulfo groups, or Q is alkylene having 1 to 6 carbon atoms, or is alkylene having 2 to 8 carbon atoms, which is interrupted by 1 or 2 hetero groups, or Q is alkylene-A-phenylene, phenylene-A-alkylene, alkylene-A-phenylene-A-alkylene, phenylene-A-alkylene-phenylene or phenylene-A-phenylene, in which each phenylene independently of one another is phenylene which is optionally substituted by 1 or 2 of the following substituents: from the alkyl having 1 to 4 carbon atoms, alkoxy having 1 to 4 carbon atoms, halogen, nitro, hydroxy, carboxy or sulfo, each alkylene independently of one another is alkylene having 1 to 6 carbon atoms or alkylene having 2 to 8 carbon atoms, which is interrupted by 1 or 2 hetero groups, and each A independently of one another is a direct bond or a hetero group of the formulae —O—, —SO$_2$—, —CO—, —NH—, —CO—NH—, —NH—CO—, —SO$_2$—NH—, —NH—SO$_2$—, —SO$_2$— or —N(-R)—, in which R is alkyl having 1 to 4 carbon atoms, which is optionally substituted by hydroxy, sulfato, phosphato, sulfo or acetyloxy, or is propionyl or acetyl, or z is the number zero or 1, y is the number 1 or 2, and y is 1 if z is 1, Y is vinylsulfonyl, β-chloroethylsulfonyl, β-phosphatoethylsulfonyl or β-sulfatoethylsulfonyl, Hal is chlorine or fluorine and X$^0$, is chlorine or fluorine.

2. A dyestuff as claimed in claim 1, corresponding to the formula (3a)

$$D_1-N=N-(E-N=N)_r-K_2-Z \tag{3a}$$

in which

D$_1$ is a radical of the formula (4a) or (4b)

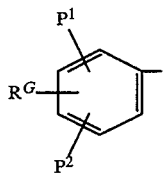

(4a)

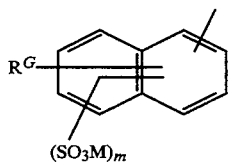

(4b)

in which

R$^G$ is hydrogen or sulfo,

P¹ is hydrogen, methyl, ethyl, methoxy, ethoxy, alkanoyl having 2 to 5 carbon atoms, cyano, sulfo, carboxy, alkoxycarbonyl having 2 to 5 carbon atoms, carbamoyl, N-(C$_1$-C$_4$-alkyl)-carbamoyl, fluorine, chlorine, bromine or trifluoro methyl, P² is hydrogen, methyl, ethyl, methoxy, ethoxy, cyano, carboxy, sulfo, alkanoylamino having 2 to 5 carbon atoms, alkoxycarbonyl having 2 to 5 carbon atoms, carbamoyl, N-(C$_1$-C$_4$-alkyl)-sulfamoyl, sulfophenylamidocarbonyl, phenylamidocarbonyl, alkylsulfonyl having 1 to 4 carbon atoms, phenylsulfonyl or phenoxy, and in which the benzene nucleus in formulae (4a) and (4b) optionally contains a hydroxy group in the ortho-position relative to the free bond leading to the azo group, m is the number zero, 1 or 2 (this group being a hydrogen atom in the case where m is zero) and M is hydrogen or a salt-forming metal atom, —K$_2$—Z is a radical of the formula (9a), (9b), (9c), (9d), (9e), (9f), (9g) or (9h)

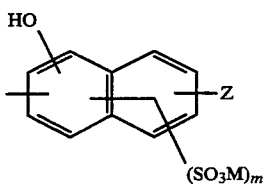
(9a)

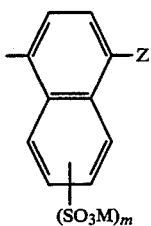
(9b)

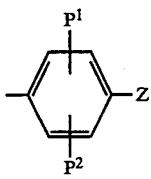
(9c)

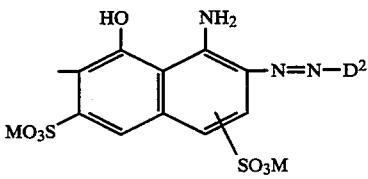
(9d)

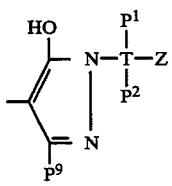
(9e)

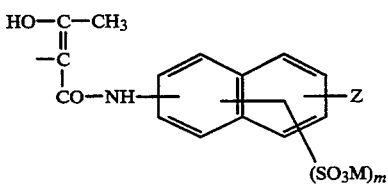
(9f)

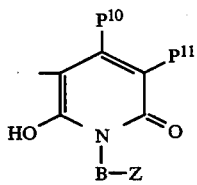
(9g)

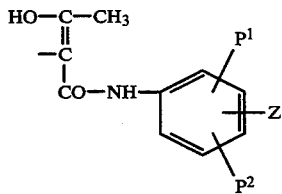
(9h)

in which
P¹, P², M and m have one of the abovementioned meanings,

Z has the meaning given in claim 1,
P⁹ is hydrogen, alkyl having 1 to 4 carbon atoms, cyano, carboxy, carbalkoxy having 2 to 5 carbon atoms, carbamoyl or phenyl,
P¹⁰ is hydrogen, alkyl having 1 to 4 carbon atoms, or alkyl having 1 to 4 carbon atoms which is substituted by alkoxy having 1 to 4 carbon atoms or cyano,
P¹¹ is hydrogen, chlorine, bromine, sulfo, carbamoyl, methylsulfonyl, phenylsulfonyl, cyano or sulfoalkyl having 1 to 4 carbon atoms,
T is a benzene or naphthalene ring,
B is alkylene having 1 to 4 carbon atoms, methylenephenylene, ethylenephenylene, phenylenemethylene, phenyleneethylene or phenylene, or methylenephenylene, ethylenephenylene or phenylene which are substituted in the benzene radical by fluorine, chlorine, bromine, methyl, methoxy, cyano, sulfo, carboxy, acetyl, nitro, carbamoyl and/or sulfamoyl, and
D² is a radical of the formula (6a) or (6b)

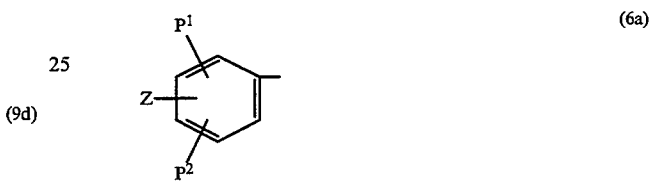
(6a)

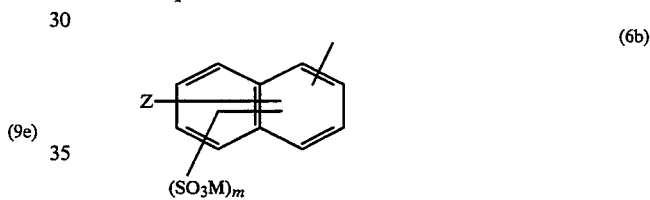
(6b)

in which Z, M, m, P¹ and P² have one of the abovementioned meanings, and in which the benzene nucleus optionally contains a hydroxy group in the ortho-position relative to the free bond leading to the azo group,
v is the number 1 or 2 and
E is a radical of the formula (7a), (7b) or (7c)

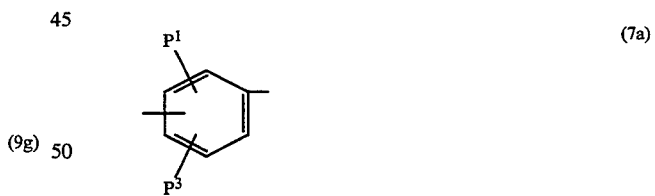
(7a)

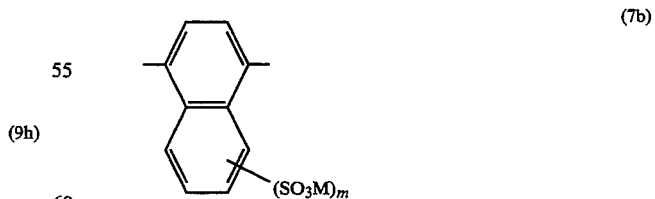
(7b)

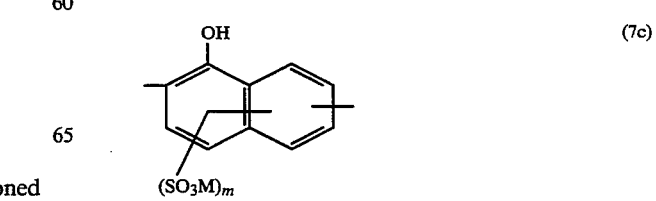
(7c)

in which

P¹, M and m have one of the abovementioned meanings and

P³ is hydrogen, alkyl having 1 to 4 carbon atoms, alkoxy having 1 to 4 carbon atoms, chlorine, alkanoylamino having 2 to 5 carbon atoms, benzoylamino, ureido, phenylureido, alkylureido having 1 to 4 carbon atoms in the alkyl radical, phenylsulfonyl or alkylsulfonyl having 1 to 4 carbon atoms.

3. A dyestuff as claimed in claim 1, corresponding to the formula (3b )

(3b)

in which

Z—D₂— is a group of the formula (6a) or (6b)

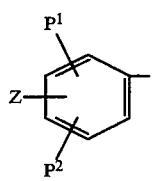
(6a)

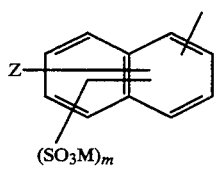
(6b)

in which

Z has the meaning given in claim 1,

P¹ is hydrogen, methyl, ethyl, methoxy, ethoxy, alkanoyl having 2 to 5 carbon atoms, cyano, sulfo, carboxy, alkoxycarbonyl having 2 to 5 carbon atoms, carbamoyl, N-(C₁-C₄-alkyl)-carbamoyl, fluorine, chlorine, bromine or trifluorolomethyl, P² is hydrogen, methyl, ethyl, methoxy, ethoxy, cyano, carboxy, sulfo, alkanoylamino having 2 to 5 carbon atoms, alkoxycarbonyl having 2 to 5 carbon atoms, carbamoyl, N-(C₁-C₄-alkyl)-sulfamoyl, sulfophenylamidocarbonyl, phenylamidocarbonyl, alkylsulfonyl having 1 to 4 carbon atoms, phenylsulfonyl or phenoxy, and in which the benzene nucleus in formulae (6a) and (6b) optionally contains a hydroxy group in the ortho-position relative to the free bond leading to the azo group, m is the number zero, 1 or 2 (this group being a hydrogen atom in the case where m is zero) and M is hydrogen or a salt-forming metal atom, K₁ is a radical of the formula (8a), (8b), (8c), (8d), (8e), (8f), (8g) or (8h)

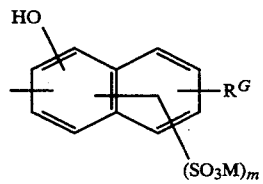
(8a)

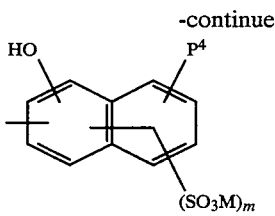
(8b)

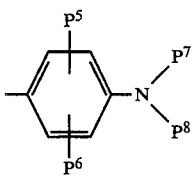
(8c)

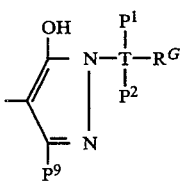
(8d)

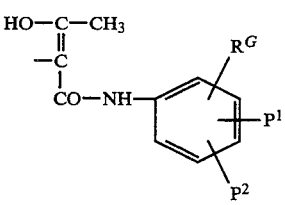
(8e)

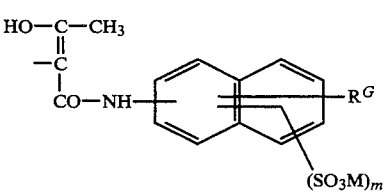
(8f)

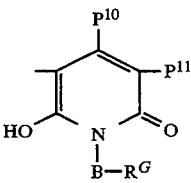
(8g)

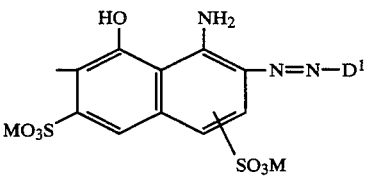
(8h)

in which

P¹, P², m and M have one of the abovementioned meanings,

R^G is hydrogen or sulfo,

P⁴ is phenylureido, which is optionally substituted in the phenyl radical by substituents from the group comprising chlorine, methyl, methoxy, sulfo and carboxy, or is benzoylamino, which can be substituted in the benzene radical by at least one of the following substituents: chlorine, methyl, methoxy, nitro, sulfo and carboxy, $P^5$ is hydrogen, alkyl having 1 to 4 carbon atoms, alkoxy having 1 to 4 carbon atoms, bromine, chlorine or alkanoylamino having 2 to 7 carbon atoms, $P^6$ is hydrogen, alkyl having 1 to 4 carbon atoms, alkoxy having 1 to 4 carbon atoms, chlorine or alkanoylamino having 2 to 7 carbon atoms, ureido or phenylureido, $P^7$ is hydrogen or alkyl having 1 to 4 carbon atoms, which is optionally substituted by hydroxy, cyano, carboxy, sulfo, sulfato, methoxycarbonyl, ethoxycarbonyl or acetoxy, $P^8$ is alkyl having 1 to 4 carbon atoms, which is optionally substituted by hydroxy, cyano, carboxy, sulfo, sulfato, methoxycarbonyl, ethoxycarbonyl or acetoxy, or benzyl or phenyl, or phenyl which is substituted by alkyl having 1 to 4 carbon atoms, alkoxy having 1 to 4 carbon atoms, chlorine and/or sulfo, $P^9$ is hydrogen, alkyl having 1 to 4 carbon atoms, cyano, carboxy, carbalkoxy having 2 to 5 carbon atoms, carbamoyl or phenyl, T is a benzene or naphthalene ring, $P^{10}$ is hydrogen or alkyl having 1 to 4 carbon atoms, or alkyl having 1 to 4 carbon atoms, which is substituted by alkoxy having 1 to 4 carbon atoms or by cyano, or is phenyl, $P^{11}$ is hydrogen, chlorine, bromine, sulfo, carbamoyl, methylsulfonyl, phenylsulfonyl, cyano or sulfoalkyl having 1 to 4 carbon atoms, B is alkylene having 1 to 4 carbon atoms, methylenephenylene, ethylenephenylene, phenylenemethylene, phenyleneethylene or phenylene, or is methylenephenylene, ethylenephenylene or phenylene which are substituted in the benzene radical by fluorine, chlorine, bromine, methyl, methoxy, cyano, sulfo, carboxy, acetyl, nitro, carbamoyl and/or sulfamoyl and $D^1$ is a radical of the formula (4a) or (4b)

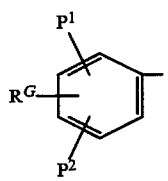 (4a)

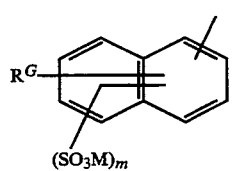 (4b)

in which $P^1$, $P^2$, $R^G$, M and m have one of the abovementioned meanings, and in which the particular benzene nucleus optionally contains a hydroxy group in the ortho-position relative to the free bond leading to the azo group, v is the number zero or 1 and E is a radical of the formula (7a), (7b) or (7c)

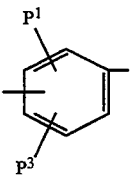 (7a)

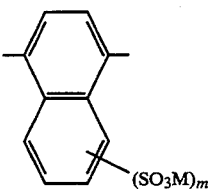 (7b)

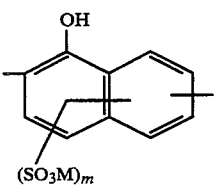 (7c)

in which $P^1$, M and m have one of the abovementioned meanings and $P^3$ is hydrogen, alkyl having 1 to 4 carbon atoms, alkoxy having 1 to 4 carbon atoms, chlorine, alkanoylamino having 2 to 5 carbon atoms, benzoylamino, ureido, phenylureido, alkylureido having 1 to 4 carbon atoms in the alkyl radical, phenylsulfonyl or alkylsulfonyl having 1 to 4 carbon atoms.

4. A dyestuff as claimed in claim 1, of the formula (3e)

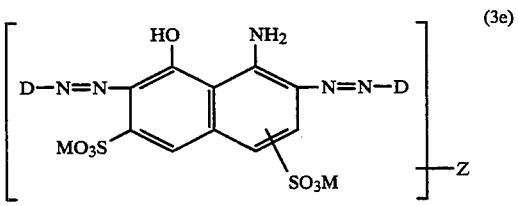 (3e)

in which

M is hydrogen or a salt-forming metal atom, one radical D is a group of the formula (4a) or (4b)

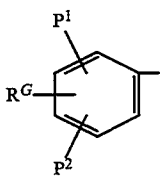 (4a)

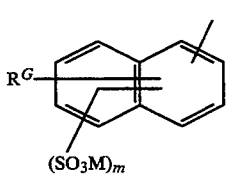 (4b)

in which $R^G$ is hydrogen or sulfo, $P^1$ is hydrogen, methyl, ethyl, methoxy, ethoxy, alkanoyl having 2 to 5 carbon atoms, cyano, sulfo, carboxy, alkoxycarbonyl having 2 to 5 carbon atoms, carbamoyl, N-($C_1$–$C_4$-alkyl)-carbamoyl, fluorine, chlorine, bromine or trifluoromethyl, $P^2$ is hydrogen, methyl, ethyl, methoxy, ethoxy, cyano, carboxy, sulfo, alkanoylamino having 2 to 5 carbon atoms, alkoxycarbonyl having 2 to 5 carbon atoms, carbamoyl, N-($C_1$–$C_4$-alkyl)-sulfamoyl, sulfophenylamidocarbonyl, phenylamidocarbonyl, alkylsulfonyl having 1 to 4 carbon atoms, phenylsulfonyl or phenoxy, and in which the benzene nucleus in formulae (4a) and (4b) optionally contains a hydroxy group in the ortho-position relative to the free bond leading to the azo group, m is the number zero, 1 or 2 (this group being a hydrogen atom in the case where m is zero) and M is hydrogen or a salt-forming metal atom, and the other D is bonded to Z and this radical —D—Z is a radical of the formula (6a) or (6b)

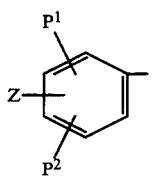
(6a)

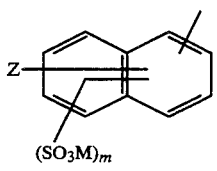
(6b)

in which $P^1$, $P^2$, M, m and Z have the abovementioned meanings or the meanings given in claim 1.

5. A dyestuff as claimed in claim 1, of the formula (3g)

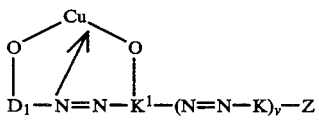
(3g)

in which $D_1$ is a radical of the formula (5a) or (5b)

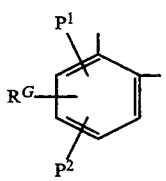
(5a)

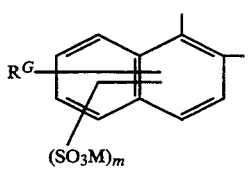
(5b)

in which $R^G$ is hydrogen or sulfo, $P^1$ is hydrogen, methyl, ethyl, methoxy, ethoxy, alkanoyl having 2 to 5 carbon atoms, cyano, sulfo, carboxy, alkoxycarbonyl having 2 to 5 carbon atoms, carbamoyl, N-($C_1$–$C_4$-alkyl)-carbamoyl, fluorine, chlorine, bromine or trifluoromethyl, $P^2$ is hydrogen, methyl, ethyl, methoxy, ethoxy, cyano, carboxy, sulfo, alkanoylamino having 2 to 5 carbon atoms, alkoxycarbonyl having 2 to 5 carbon atoms, carbamoyl, N-($C_1$–$C_4$-alkyl)-sulfamoyl, sulfophenylamidocarbonyl, phenylamidocarbonyl, alkylsulfonyl having 1 to 4 carbon atoms, phenylsulfonyl or phenoxy, m is the number zero, 1 or 2 (this group being a hydrogen atom in the case where m is zero) and M is hydrogen or a salt-forming metal atom, v is the number zero or 1, $K^1$ is a radical of the formula

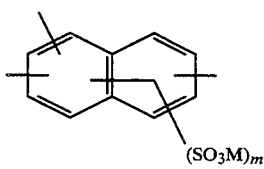

or

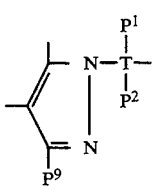

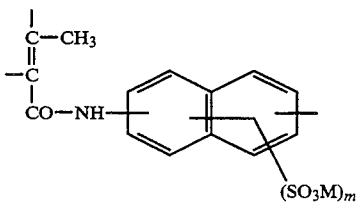

or

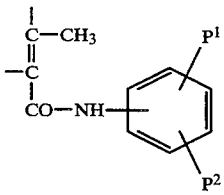

in which $P^1$, $P^2$, M and m have one of the abovementioned meanings and $P^9$ is hydrogen, alkyl having 1 to 4 carbon atoms, cyano, carboxy, carbalkoxy having 2 to 5 carbon atoms, carbamoyl or phenyl, T is a benzene or naphthalene ring, and in which, in the case where v is zero, $K^1$—Z can also be a radical of the formula

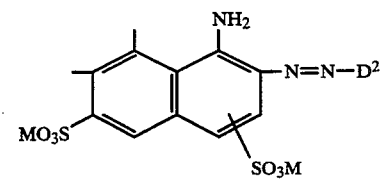

in which

M has one of the abovementioned meanings and
D² is a radical of the formula (6a) or (6b)

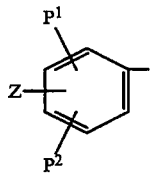

(6a)

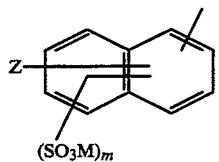

(6b)

in which P¹, P², Z, M and m have one of the abovementioned meanings or one of the meanings given in claim 1.

6. A dyestuff as claimed in claim 1, corresponding to the formula (13)

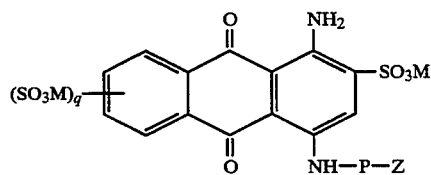

(13)

in which

Z has the meaning given in claim 1,

M is hydrogen or a salt-forming metal atom,

P is phenylene, which can be substituted by 1, 2, 3 or 4 of the following substituents: alkyl having 1 to 4 carbon atoms, alkoxy having 1 to 4 carbon atoms, halogen, carboxy and sulfo, or is alkylene having 1 to 4 carbon atoms or -alk-NH-alk-or -phen-NH-alk-, in which phen is optionally substituted phenylene and alk is alkylene having 1 to 4 carbon atoms, or P is optionally substituted cyclohexylene, and q is the number zero or 1 (this group being hydrogen in the case where q is zero).

7. A dyestuff as claimed in claim 1, corresponding to the formula (14)

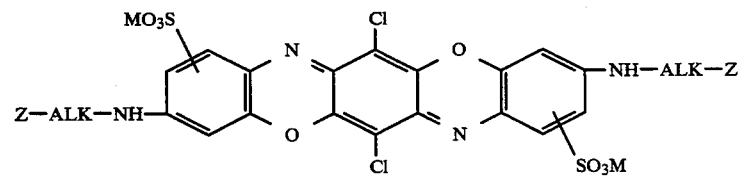

(14)

in which

Z has the meaning given in claim 1,

M is hydrogen or a salt-forming metal atom and

ALK is alkylene having 2 to 6 carbon atoms, which can be interrupted by 1 or 2 hetero groups and/or substituted, or is cyclohexylene.

8. A dyestuff as claimed in claim 1, corresponding to the formula (15)

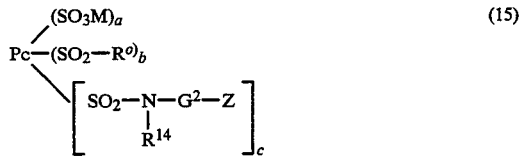

(15)

in which:

Pc is the radical of a copper phthalocyanine or nickel phthalocyanine;

R⁰ is an amino group of the formula —NR¹¹R¹², in which R¹¹ and R¹² independently of one another are hydrogen or alkyl having 1 to 4 carbon atoms, which can be substituted by hydroxy or sulfo, or is a heterocyclic N-containing radical;

R¹⁴ is hydrogen or alkyl having 1 to 4 carbon atoms;

G² is phenylene, which can be substituted by 1 or 2 substituents from the group comprising alkyl having 1 to 4 carbon atoms, halogen, carboxy and sulfo;

Z has the meaning given in claim 1;

a is a number from zero to 3, b is a number from zero to 3 and c is a number from 1 to 2, and in which the sum of (a+b+c) is a number from 2 to 4.

9. A dyestuff as claimed in claim 1, corresponding to the formula (16)

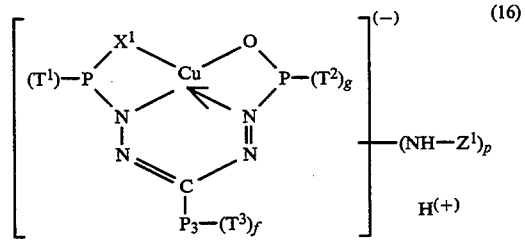

(16)

in which:

X¹ is an oxygen atom or the carbonyloxy group of the formula —COO—;

P₁ and P₂ independently of one another are each a benzene or naphthalene ring, in which the nitrogen atom and the group X¹ are bonded to P¹ in the ortho-position relative to one another and the oxygen atom and the nitrogen atom are bonded to P² in the ortho-position relative to one another and the benzene nuclei or naphthalene nuclei are optionally further substituted by one or two substituents from the group comprising halogen, nitro, alkyl having 1 to 4 carbon atoms, sulfamoyl, sulfamoyl which is mono- or disubstituted by alkyl having 1 to 4 carbon atoms, methoxy, ethoxy, alkylsulfonyl having 1 to 4 carbon atoms and phenylsulfonyl;

$P_3$ is a straight-chain or branched alkylene group having 2 to 6 carbon atoms, which is optionally substituted by a sulfophenyl group, or is a phenylene group or a naphthylene group, which are optionally substituted by 1 or 2 substituents from the group comprising methyl, ethyl, methoxy, ethoxy and chlorine;

$T^1$, $T^2$ and $T^3$ independently of one another are each a sulfo or carboxy group;

e, f and g independently of one another are each the number zero, 1 or 2, the sum of (e+f+g) being an integer from 1 to 4 and the group $T^1$, $T^2$ or $T^3$ being a hydrogen atom in the case where e or f or g is zero; and p is the number 1 or 2, and in which the group —NH—Z can be bonded to an aromatic radical of $P_1$, $P_2$ or $P_3$.

10. A dyestuff as claimed in claim 1, in which $R^x$ or $R^y$ or both are hydrogen.

11. A dyestuff as claimed in claim 1, in which Y is vinylsulfonyl or $\beta$-sulfatoethylsulfonyl.

12. A dyestuff as claimed in claim 1, in which z is the number zero.

13. A dyestuff as claimed in claim 1, in which Hal and $X^0$ are both chlorine.

14. A dyestuff as claimed in claim 2, in which $R^x$ or $R^y$ or both are hydrogen.

15. A dyestuff as claimed in claim 3, in which $R^x$ or $R^y$ or both are hydrogen.

16. A dyestuff as claimed in claim 4, in which $R^x$ or $R^y$ or both are hydrogen.

17. A dyestuff as claimed in claim 6, in which $R^x$ or $R^y$ or both are hydrogen.

18. A dyestuff as claimed in claim 7, in which $R^x$ or $R^y$ or both are hydrogen.

19. A dyestuff as claimed in claim 8, in which $R^x$ or $R^y$ or both are hydrogen.

20. A dyestuff as claimed in claim 1, in which $R^x$ or $R^y$ is methyl.

* * * * *